United States Patent
Nakata et al.

(10) Patent No.: US 10,104,124 B2
(45) Date of Patent: Oct. 16, 2018

(54) ANALYSIS RULE ADJUSTMENT DEVICE, ANALYSIS RULE ADJUSTMENT SYSTEM, ANALYSIS RULE ADJUSTMENT METHOD, AND ANALYSIS RULE ADJUSTMENT PROGRAM

(71) Applicant: NIPPON TELEGRAPH AND TELEPHONE CORPORATION, Chiyoda-ku (JP)

(72) Inventors: Kensuke Nakata, Musashino (JP); Kazunori Kamiya, Musashino (JP); Takeshi Yagi, Musashino (JP); Tohru Sato, Musashino (JP); Daiki Chiba, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 40 days.

(21) Appl. No.: 15/119,162

(22) PCT Filed: Mar. 16, 2015

(86) PCT No.: PCT/JP2015/057710
§ 371 (c)(1),
(2) Date: Aug. 16, 2016

(87) PCT Pub. No.: WO2015/141630
PCT Pub. Date: Sep. 24, 2015

(65) Prior Publication Data
US 2017/0013018 A1   Jan. 12, 2017

(30) Foreign Application Priority Data
Mar. 19, 2014   (JP) ................. 2014-056660

(51) Int. Cl.
*H04L 29/06* (2006.01)
*H04L 12/64* (2006.01)
(Continued)

(52) U.S. Cl.
CPC ............ *H04L 63/20* (2013.01); *G06F 21/552* (2013.01); *H04L 12/6418* (2013.01);
(Continued)

(58) Field of Classification Search
CPC ..... H04L 63/20; H04L 43/04; H04L 12/6418; H04L 2463/144; H04L 63/1425; G06F 21/552; G06F 2221/2151
See application file for complete search history.

(56) References Cited

U.S. PATENT DOCUMENTS

| 5,787,177 A | 7/1998 | Leppek |
| 5,974,149 A | 10/1999 | Leppek |

(Continued)

FOREIGN PATENT DOCUMENTS

| JP | 2009-181335 A | 8/2009 |
| JP | 2011-525285 A | 9/2011 |

(Continued)

OTHER PUBLICATIONS

Extended European Search Report dated Jun. 7, 2017 in Patent Application No. 15765105.0.
(Continued)

*Primary Examiner* — John B King
(74) *Attorney, Agent, or Firm* — Oblon, McClelland, Maier & Neustadt, L.L.P.

(57) ABSTRACT

There is provided an analysis rule adjustment device that adjusts an analysis rule used in a communication log analysis performed to detect malicious communication through a network. The analysis rule adjustment device includes a log acquisition unit, a log analysis unit, and a first analysis unit.
(Continued)

The log acquisition unit acquires a communication log through a network to be defended and a communication log generated by malware. The log analysis unit analyzes the communication log acquired by the log acquisition unit on the basis of predetermined analysis rule and tuning condition. The first analysis unit analyzes an analysis result by the log analysis unit and calculates a recommended tuning value used in an adjustment of the predetermined analysis rule and satisfying the tuning condition.

15 Claims, 18 Drawing Sheets

(51) Int. Cl.
*G06F 21/55* (2013.01)
*H04L 12/26* (2006.01)

(52) U.S. Cl.
CPC ...... *H04L 43/04* (2013.01); *G06F 2221/2151* (2013.01); *H04L 63/1425* (2013.01); *H04L 2463/144* (2013.01)

(56) References Cited

U.S. PATENT DOCUMENTS

| | | |
|---|---|---|
| 6,189,104 B1 | 2/2001 | Leppek |
| 6,408,391 B1 | 6/2002 | Huff et al. |
| 8,762,948 B1* | 6/2014 | Zaitsev ............... G06F 9/45558 717/124 |
| 9,223,972 B1* | 12/2015 | Vincent ................. G06F 21/566 |
| 2001/0001156 A1 | 5/2001 | Leppek |
| 2006/0259968 A1* | 11/2006 | Nakakoji ............. G06F 21/552 726/22 |
| 2009/0320133 A1 | 12/2009 | Viljoen et al. |
| 2014/0215617 A1* | 7/2014 | Smith ................. H04L 63/1441 726/23 |
| 2016/0335110 A1* | 11/2016 | Paithane ............. G06F 9/45558 |

FOREIGN PATENT DOCUMENTS

| | | |
|---|---|---|
| JP | 2013-92981 A | 5/2013 |
| WO | WO 99/57625 A1 | 11/1999 |
| WO | WO 02/14989 A2 | 2/2002 |
| WO | WO 2013/109156 A1 | 7/2013 |

OTHER PUBLICATIONS

International Search Report dated Jun. 16, 2015 in PCT/JP2015/057710, filed Mar. 16, 2015.

Nanto Suzuki et al., "Cyber Kogeki Kenchi Ni Kakawaru Parameter Chushutsuho No Kento", Dai 76 Kai Zenkoku Taikai Koen Ronbunshu, Mar. 11, 2014, pp. 625-626 (with English Translation).

Kensuke Nakata, "Anomaly Communication Detection Method by Analyzing Network Logs", Information and Communication Engineers, 2013 General Conference, 2013, 1 page (with English Translation).

Office Action dated Dec. 6, 2016 in Japanese Patent Application No. 2016-508718 (with English language translation).

* cited by examiner

FIG.2

| ITEM NUMBER | ITEM NAME | NOTE |
|---|---|---|
| 1 | TIME STAMP | TIME WHEN LOG IS ACQUIRED |
| 2 | LogSource | ID UNIQUE TO EACH DEVICE RECORDING LOG |
| 3 | SOURCE IP ADDRESS | SOURCE IP ADDRESS INFORMATION IN RELEVANT COMMUNICATION |
| 4 | SOURCE PORT NUMBER | SOURCE PORT NUMBER IN RELEVANT COMMUNICATION |
| 5 | DESTINATION IP ADDRESS | DESTINATION IP ADDRESS IN RELEVANT COMMUNICATION |
| 6 | DESTINATION PORT NUMBER | DESTINATION PORT NUMBER IN RELEVANT COMMUNICATION |
| 7 | COMMUNICATION PROTOCOL NAME | COMMUNICATION PROTOCOL NAME IN RELEVANT COMMUNICATION |
| 8 | DETERMINATION RESULT | DETERMINATION RESULT PERTAINING TO DEVICE IN RELEVANT COMMUNICATION |
| 9 | NUMBER OF BYTES TRANSMITTED | NUMBER OF BYTES TRANSMITTED IN RELEVANT COMMUNICATION |
| 10 | NUMBER OF BYTES RECEIVED | NUMBER OF BYTES RECEIVED IN RELEVANT COMMUNICATION |
| 11 | URL | DESTINATION URL WHEN RELEVANT COMMUNICATION IS HTTP COMMUNICATION |
| 12 | METHOD NAME | HTTP METHOD NAME WHEN RELEVANT COMMUNICATION IS HTTP COMMUNICATION |
| 13 | UserAgent | HTTP USER AGENT NAME WHEN RELEVANT COMMUNICATION IS HTTP COMMUNICATION |
| 14 | STATUS CODE | HTTP STATUS CODE WHEN RELEVANT COMMUNICATION IS HTTP COMMUNICATION |
| 15 | DURATION | SESSION DURATION IN RELEVANT COMMUNICATION |
| 16 | DIRECTION OF COMMUNICATION | DIRECTION OF COMMUNICATION IN RELEVANT COMMUNICATION |

FIG.3

| SERIAL NUMBER | SOURCE IP ADDRESS | DESTINATION IP ADDRESS | SOURCE PORT NUMBER | DESTINATION PORT NUMBER | URL |
|---|---|---|---|---|---|
| 1 | 10.0.0.1 | 198.51.100.98 | 51234 | 80 | http://www.example.com/ghijkl/index.php?test=456 |
| 2 | 10.0.0.2 | 192.0.2.100 | 50032 | 60320 | - |
| 3 | 10.0.0.2 | 192.0.2.100 | 12345 | 80 | http://www.example.com/test/hoge.php |
| ... | ... | ... | ... | ... | ... |
| 231 | 10.23.242.1 | 192.0.2.99 | 24323 | 23 | - |
| 232 | 10.22.2.145 | 203.0.113.10 | 12345 | 53 | - |
| 233 | 10.55.65.3 | 203.0.113.10 | 34567 | 80 | http://www.example.net/index.php?foo=8 |
| ... | ... | ... | ... | ... | ... |

FIG.4

| SERIAL NUMBER | MALWARE IDENTIFIER | SOURCE IP ADDRESS | DESTINATION IP ADDRESS | SOURCE PORT NUMBER | DESTINA-TION PORT NUMBER | URL | ⋮ |
|---|---|---|---|---|---|---|---|
| 1 | M1 | 10.0.0.1 | 198.51.100.98 | 51234 | 80 | http://www.example.com/abcdef/index.php?test=123 | ⋮ |
| 2 | M1 | 10.0.0.2 | 192.0.2.100 | 50032 | 60320 | - | ⋮ |
| 3 | M1 | 10.0.0.2 | 192.0.2.100 | 12345 | 80 | http://www.example.com/test/image.php | ⋮ |
| ⋮ | ⋮ | ⋮ | ⋮ | ⋮ | ⋮ | ⋮ | ⋮ |
| 231 | M100 | 10.23.242.1 | 192.0.2.99 | 24323 | 23 | - | ⋮ |
| 232 | M100 | 10.22.2.145 | 203.0.113.10 | 12345 | 53 | - | ⋮ |
| 233 | M101 | 10.55.65.3 | 203.0.113.10 | 34567 | 80 | http://www.example.net/index.php?num=2 | ⋮ |
| ⋮ | ⋮ | ⋮ | ⋮ | ⋮ | ⋮ | ⋮ | ⋮ |

FIG.5

| TIME STAMP | SOURCE IP ADDRESS | DESTINATION IP ADDRESS | DESTINATION PORT NUMBER | SOURCE PORT NUMBER | COMMUNICATION PROTOCOL NAME | NUMBER OF BYTES TRANSMITTED | NUMBER OF BYTES RECEIVED | URL | UserAgent | METHOD NAME | DETERMINATION RESULT |
|---|---|---|---|---|---|---|---|---|---|---|---|
| 2013/02/03 15:23:15 | 192.168.100.15 | 100.10.20.30 | 80 | 1234 | TCP | 12345 | 100 | http://aaa.co.jp/ | Mozilla/4.0 (compatible; MSIE 7.0; Windows NT 5.1) | GET | ACCEPT |
| ... | ... | ... | ... | ... | ... | ... | ... | ... | ... | ... | ... |
| ... | ... | ... | ... | ... | ... | ... | ... | ... | ... | ... | ... |
| ... | ... | ... | ... | ... | ... | ... | ... | ... | ... | ... | ... |
| ... | ... | ... | ... | ... | ... | ... | ... | ... | ... | ... | ... |
| ... | ... | ... | ... | ... | ... | ... | ... | ... | ... | ... | ... |

FIG.6

| RULE NUMBER | RULE DESCRIPTION | PARAMETER | APPLIED THRESHOLD |
|---|---|---|---|
| 001 | DETECT SOURCE IP ADDRESS PERFORMING COMMUNICATION WITH SINGLE DESTINATION FOR MANY TIMES IN CERTAIN PERIOD | NUMBER OF APPEARANCES IN FIVE MINUTES | 40 |
| 002 | DETECT MALIGNANT DESTINATION PORT NUMBER | NUMBER OF TIMES COMMUNICATION IS PERFORMED IN TEN MINUTES | 10 |
| ⋮ | ⋮ | ⋮ | ⋮ |

FIG.7

| CONDITION NUMBER | TUNING SETTING INFORMATION | TARGET RULE NUMBER |
|---|---|---|
| 001 | ·THRESHOLD FALLS WITHIN RANGE OF 10 TO 50<br>·THRESHOLD IS ADJUSTED AT INTERVAL OF 2<br>·TOLERANCE OF FALSE DETECTION RATE IS 0.5% OR LOWER | 001 |
| 002 | ⋮ | ⋮ |
| ⋮ | ⋮ | ⋮ |

| APPLIED RULE NUMBER | TUNING SETTING CONDITION | APPLIED THRESHOLD | FALSE DETECTION RATE | DETECTION RATE |
|---|---|---|---|---|
| 001 | 001 | 10 | 50% | 20% |
| | | 12 | 45% | 30% |
| | | 14 | ⋮ | ⋮ |
| | | 16 | ⋮ | ⋮ |
| | | ⋮ | ⋮ | ⋮ |
| ⋮ | ⋮ | ⋮ | ⋮ | ⋮ |

FIG.12

| APPLIED RULE NUMBER | TUNING SETTING CONDITION | APPLIED THRESHOLD | FALSE DETECTION RATE | DETECTION RATE | DETECTED SAMPLE | MALWARE IDENTIFIER |
|---|---|---|---|---|---|---|
| 001 | 001 | 10 | 50% | 20% | 51234,50032,34567 | M100 |
| | | 12 | 45% | 30% | 24323,50032 | M100 |
| | | 14 | ... | ... | ... | M100 |
| | | 16 | ... | ... | ... | M100 |
| ... | ... | ... | ... | ... | ... | M100 |

FIG.13

| APPLIED RULE NUMBER | TUNING SETTING CONDITION | RECOMMENDED TUNING VALUE | FALSE DETECTION RATE | DETECTION RATE | DETECTED SAMPLE | MALWARE IDENTIFIER |
|---|---|---|---|---|---|---|
| 013 | 015 | 30 | 0.1% | 70% | 51234,50032,34567 | M110 |
| 024 | 100 | 1 | 0.3% | 80% | 24323,50032 | M257 |
| 001 | 001 | 5 | ... | ... | ... | M300 |
| ... | ... | ... | ... | ... | ... | ... |
| ... | ... | ... | ... | ... | ... | ... |
| ... | ... | ... | ... | ... | ... | ... |

FIG.14

| SET NUMBER | RULE SET | THRESHOLD | APPLIED ENVIRONMENT |
|---|---|---|---|
| 001 | 001,005,110 | 10,5,1000 | NW005 |
| ⋮ | ⋮ | ⋮ | ⋮ |

| SET | ANALYSIS RULE | DETECTED SAMPLE |
|---|---|---|
| 1 | A,B,C | a,b,c,d,e,f |
| 2 | B,C | a,b,c,d,e,f |
| 3 | A,C | a,d,e |

ANALYSIS RULE ADJUSTMENT DEVICE, ANALYSIS RULE ADJUSTMENT SYSTEM, ANALYSIS RULE ADJUSTMENT METHOD, AND ANALYSIS RULE ADJUSTMENT PROGRAM

FIELD

The present invention relates to an analysis rule adjustment device, an analysis rule adjustment system, an analysis rule adjustment method, and an analysis rule adjustment program.

BACKGROUND

With the widespread use of communication networks, diverse approaches are taken to launch a cyber attack on various services and infrastructures through the communication networks.

Security appliances such as an IDS (Intrusion Detection System), an IPS (Intrusion Prevention System) and a firewall (FW) have been known and provided to cope with a threat of such cyber attack and control communication at a gateway for communication data. The firewall and IDS/IPS take defensive measures against malicious communication by monitoring information entering an internal network from an external network as illustrated in FIG. 20, for example.

Moreover, in recent years, there has been known a rule-based analysis technique that collects logs of a network appliance and the security appliance and detects a state (behavior) of malicious communication by using an analysis rule, as illustrated in FIG. 20. According to such technique, for example, there is generated an analysis rule by which the malicious communication and behavior are detected by identifying and analyzing malicious network traffic. The generated analysis rule is then used to monitor the behavior of communication and detect malicious communication and the like.

A result detected by the technique using the analysis rule is influenced by parameters and thresholds used in the analysis rule. It is thus important to set proper parameters and thresholds to prevent false detection.

CITATION LIST

Non Patent Literature

Non Patent Literature 1: Nakata, K., "Anomaly Communication Detection Method by Analyzing Network Logs", The Institute of Electronics, Information and Communication Engineers, 2013 General Conference.

SUMMARY

Technical Problem

However, according to the conventional technique of detecting the malicious communication using the analysis rule, a verification of validity of the analysis rule and an adjustment (parameter tuning) of the threshold set to the parameter used in the analysis rule are performed on the basis of an actual network environment. That is, the analysis rule is applied to the actual network environment to analyze an acquired result and perform the verification of the validity of the analysis rule as well as a minor adjustment of the threshold set to the parameter.

According to such adjustment technique, it is unable to determine the degree of undetection or false detection that can occur when the analysis rule is actually applied to malicious communication. As a result, an optimal threshold for the parameter of the analysis rule cannot be set in some cases.

Moreover, according to the aforementioned technique, an operator adjusts the threshold set to the parameter of the analysis rule while checking one by one a piece of data acquired as a result of applying the analysis rule to the actual network environment. This takes time and manpower in performing the adjustment.

The disclosed technique has been made in view of the aforementioned circumstances, where an object of the disclosed technique is to provide an analysis rule adjustment device, an analysis rule adjustment system, an analysis rule adjustment method and an analysis rule adjustment program which can optimize the analysis rule by automatically and efficiently verifying the validity of the analysis rule.

Solution to Problem

An analysis rule adjustment device, an analysis rule adjustment system, an analysis rule adjustment method, and an analysis rule adjustment program adjust an analysis rule used in analyzing a communication log to detect malicious communication through a network; the analysis rule adjustment device, the analysis rule adjustment system, the analysis rule adjustment method, and the analysis rule adjustment program acquire a communication log through a network to be defended and a communication log generated by malware; the analysis rule adjustment device, the analysis rule adjustment system, the analysis rule adjustment method, and the analysis rule adjustment program analyze the communication log acquired by the log acquisition unit on the basis of predetermined analysis rule and tuning condition; and the analysis rule adjustment device, the analysis rule adjustment system, the analysis rule adjustment method, and the analysis rule adjustment program analyze the analysis result and calculates a recommended tuning value used in an adjustment of the predetermined analysis rule and satisfying the tuning condition.

Advantageous Effects of Invention

According to the analysis rule adjustment device, the analysis rule adjustment system, the analysis rule adjustment method and the analysis rule adjustment program being disclosed, the analysis rule can be optimized by automatically and efficiently verifying the validity of the analysis rule.

BRIEF DESCRIPTION OF DRAWINGS

FIG. 2 is a table illustrating information included in a log that is processed by the analysis rule adjustment system according to the first embodiment.

FIG. 3 is a table illustrating an example of a benign log processed by the analysis rule adjustment system according to the first embodiment.

FIG. 4 is a table illustrating an example of a malignant log processed by the analysis rule adjustment system according to the first embodiment.

FIG. 5 is a table illustrating an example of a log normalized by a log collecting/accumulating device according to the first embodiment.

FIG. 6 is a table illustrating an example of an analysis rule according to the first embodiment.

FIG. 7 is a table illustrating an example of tuning setting information according to the first embodiment.

FIG. 12 is a table illustrating an example of an analysis result obtained as a result of a log analysis according to the second embodiment.

FIG. 13 is a table illustrating an example of a tuning report according to the second embodiment.

FIG. 14 is a table illustrating an example of an analysis rule set stored in an analysis rule storage unit according to the second embodiment.

DESCRIPTION OF EMBODIMENTS

Figure 1:
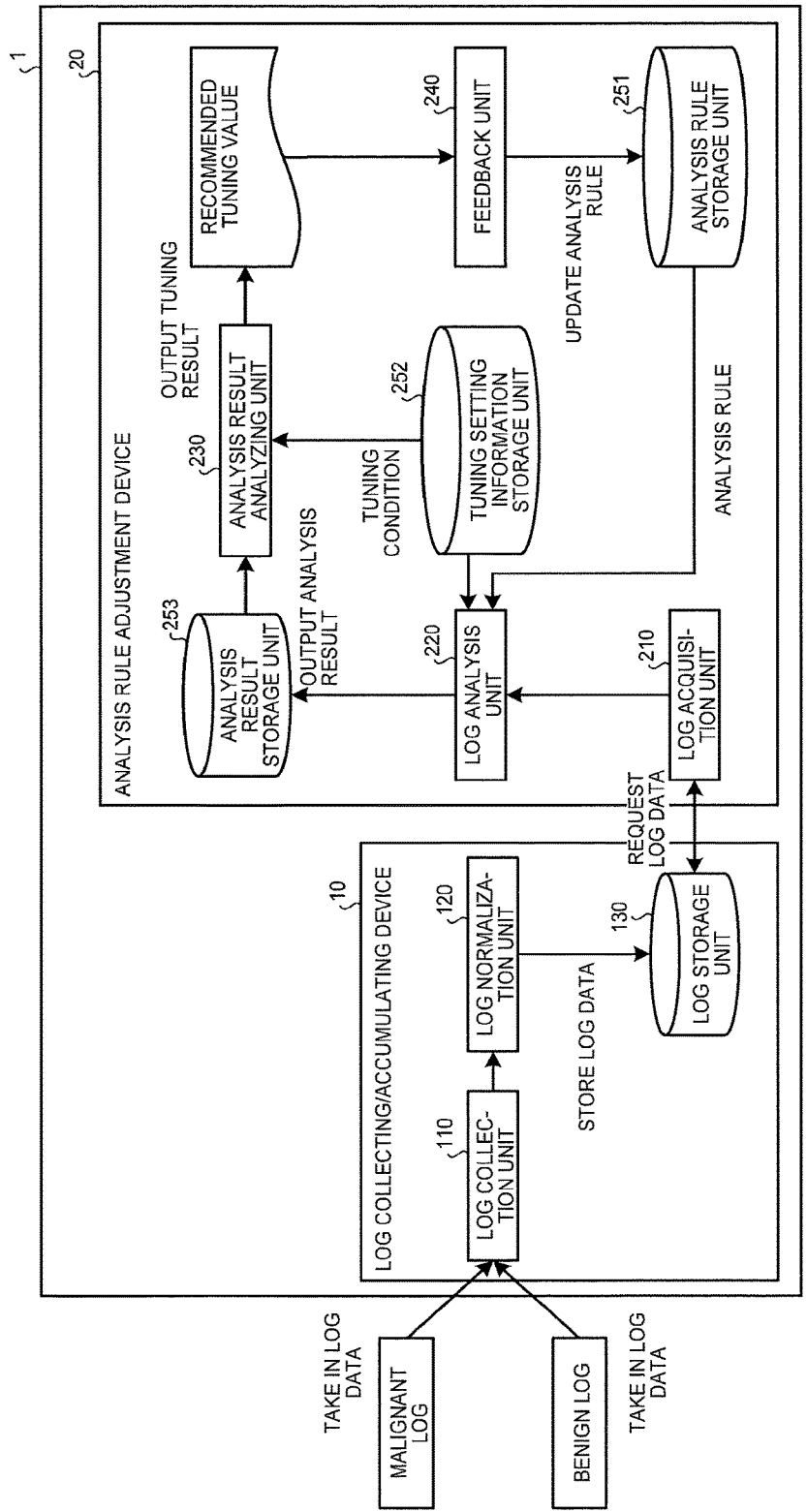
FIG. 1 is a diagram illustrating an overview of an analysis rule adjustment system according to a first embodiment.

Embodiments of disclosed device and method will now be described in detail with reference to the drawings. Note that the present invention is not to be limited to these embodiments. The embodiments can also be combined as appropriate.

(First Embodiment)

An analysis rule adjustment system 1 (refer to FIG. 1) according to a first embodiment collects two types of communication logs being a malignant log and a benign log, applies a predetermined analysis rule to both of the logs, and calculates accuracy of detecting malicious communication when the analysis rule is used. The analysis rule adjustment system 1 then shifts a parameter threshold used in the analysis rule until the calculated accuracy of detection takes a value satisfying a predetermined allowable accuracy of detection. Here, the analysis rule adjustment system 1 may shift the parameter threshold within a predetermined threshold range. The analysis rule adjustment system 1 determines, as a recommended tuning value, a parameter threshold of the analysis rule with which the accuracy of detection takes the value satisfying a predetermined condition such as the allowable accuracy of detection. Then, the analysis rule adjustment system 1 updates the analysis rule on the basis of the recommended tuning value. Note that depending on the setting of the analysis rule and/or a tuning condition, the analysis rule adjustment system 1 may not be able to acquire the analysis rule satisfying the condition by performing the adjustment. In this case, an operator may further perform a manual readjustment. It may be set not to use the analysis rule as well.

[Benign Log and Malignant Log]

A malignant log and a benign log used in adjusting the analysis rule will be described. An overview of a typical log will be described first.

A log includes information illustrated in FIG. 2, for example. FIG. 2 is a table illustrating the information included in a log that is processed by the analysis rule adjustment system 1 according to the first embodiment. As illustrated in FIG. 2, the log includes information such as "time stamp", "LogSource", "source IP address", "source port number", "destination IP address", and "destination port number". The log further includes information such as "communication protocol name", "determination result", "the number of bytes transmitted", "the number of bytes received", "URL", "method name", "UserAgent", "status code", "duration" and "direction of communication".

As illustrated in FIG. 2, the "time stamp" is information indicating a time at which the log is acquired. The "LogSource" is an identifier (ID) unique to each device recording the log. The "source IP address" is information indicating an IP address of a source of the communication. The "source port number" is information indicating a port number of the source of the communication. The "destination IP address" is information indicating an IP address of a destination of the communication. The "destination port number" is information indicating a port number of the destination of the communication. The "communication protocol name" is information indicating a communication protocol name of the communication. The "determination result" is information indicating a determination result pertaining to the device in the communication. The "the number of bytes transmitted" is information indicating the number of bytes transmitted in the communication. The "the number of bytes received" is information indicating the number of bytes received in the communication. The "URL" is information indicating a URL of the destination when the communication is HTTP communication. The "method name" is information indicating an HTTP method name when the communication is the HTTP communication. The "UserAgent" indicates an HTTP user agent name when the communication is the HTTP communication. The "status code" is information indicating an HTTP status code when the communication is the HTTP communication. The "duration" is information indicating a session duration in the communication. The "direction of communication" is information indicating a direction of communication in the communication.

Both the malignant log and the benign log include at least some of those pieces of information. Note however that the information illustrated in FIG. 2 is merely an example of information included in a log, where both the malignant log and the benign log may not include some of those pieces of information or may include information that is not illustrated in FIG. 2.

The benign log is a communication log of a network to be defended to which the analysis rule is actually applied. Specifically, the benign log refers to a communication log and an inspection result log acquired from a network appliance typified by Web proxy and a security appliance typified by FW, IDS and IPS of the network to be defended.

FIG. 3 is a table illustrating an example of the benign log processed by the analysis rule adjustment system 1 according to the first embodiment. As illustrated in FIG. 3, the benign log includes information such as the "source IP address", the "destination IP address", the "source port number", the "destination port number", and the "URL".

The malignant log refers to a communication log acquired from communication established with an external network such as a Web server on the Internet by running malware that is prepared separately. The malignant log is also collected through the appliances such as the Web proxy and FW, as with the benign log.

FIG. 4 is a table illustrating an example of the malignant log processed by the analysis rule adjustment system 1 according to the first embodiment. As illustrated in FIG. 4, the malignant log includes information such as "malware identifier", the "source IP address", the "destination IP address", the "source port number", the "destination port number", and the "URL". The "malware identifier" is information indicating the type of a sample generating traffic pertinent to the log.

In the related art, the analysis rule is adjusted (tuned) by actually applying the analysis rule to a communication log of a network to be controlled to perform a minor adjustment. When such technique is adopted, however, a change in the accuracy of detection cannot be grasped properly, making it difficult to determine precision of the adjustment. Accordingly, the analysis rule adjustment system 1 of the first embodiment performs an analysis by actually applying the analysis rule to not only the benign log being the communication log of the network to be controlled but also the malignant log, thereby accurately determining the accuracy of detection.

[Analysis Rule and Parameter]

The analysis rule and the parameter will now be described. The analysis rule is created to detect malicious communication and behavior on the basis of the analysis on the communication log of the communication performed by the malware as described above, and is used to monitor a behavior of communication and detect the malicious communication.

There can be created, as the analysis rule, an IP rule by which an analysis is performed on the basis of information primarily on 5-tuple up to Layer 4 from a log of the FW, for example. Moreover, from a log of the Web proxy, there can be created an HTTP rule by which an analysis is performed on the basis of information on the URL and UA (User Agent) included in the HTTP communication.

Specifically, focusing on a point that the malware performs communication for a plurality of times under the same condition on a regular basis in order to check communication with a server of an attacker, for example, there exists an instance counting rule by which a terminal performing communication under the same condition for a certain number of times or more from a single source IP address is detected. Moreover, focusing on a point that the malware performs similar communication by changing only a specific item in a communication condition when performing an internal search within a network to be invaded or checking communication with the server of the attacker, there exists a type counting rule by which a terminal performing communication from a single source IP address with a certain number or more variations in the specific item is detected. Furthermore, focusing on a combination and an order of specific items that occur frequently in the communication performed by the malware within a certain period of time, there exists a pattern rule by which a terminal performing communication similar to the pattern is detected. Note that these types of analysis rules are merely provided as an example. Various other analysis rules can be created on the basis of characteristics extracted from the communication performed by the malware.

Here, in the analysis rule, there are set a parameter such as the number of communications performed by using a predetermined source port number from an arbitrary source IP address and the number of connections to the same destination within a certain period of time, and a threshold used to determine whether or not a terminal with the source IP address is infected with the malware. The analysis rule can be set, for example, to have a parameter being the number of appearances of a destination IP address that appears frequently in the malignant log among destination IP addresses with which the arbitrary source IP address communicates and a threshold being ten times in one hour, and to detect communication as malicious communication when the destination IP address appears ten times or more in one hour.

[Parameter Tuning and Tuning Condition]

Parameter tuning is performed when the analysis rule set as described above is applied to the network to be defended. The parameter tuning is an adjustment performed to properly set the threshold of the parameter used in the analysis rule. In the present embodiment, a tuning condition for the parameter tuning is determined in advance. The tuning condition is a condition stating that "a tolerance of a false detection rate is 0.5% or lower", "the threshold is adjusted at 0.5 intervals", and "the threshold falls within the range of 1 to 100", for example. The analysis rule adjustment system 1 performs tuning on the analysis rule for a log on the basis of the tuning condition and optimizes the threshold of the parameter used in the analysis rule.

An embodiment will now be described with the aforementioned concept as the assumption.

[Example of Configuration of Analysis Rule Adjustment System According to First Embodiment]

FIG. 1 is a diagram illustrating an overview of the analysis rule adjustment system 1 according to the first embodiment. The analysis rule adjustment system 1 of the first embodiment includes a log collecting/accumulating device 10 and an analysis rule adjustment device 20.

Figure 20:
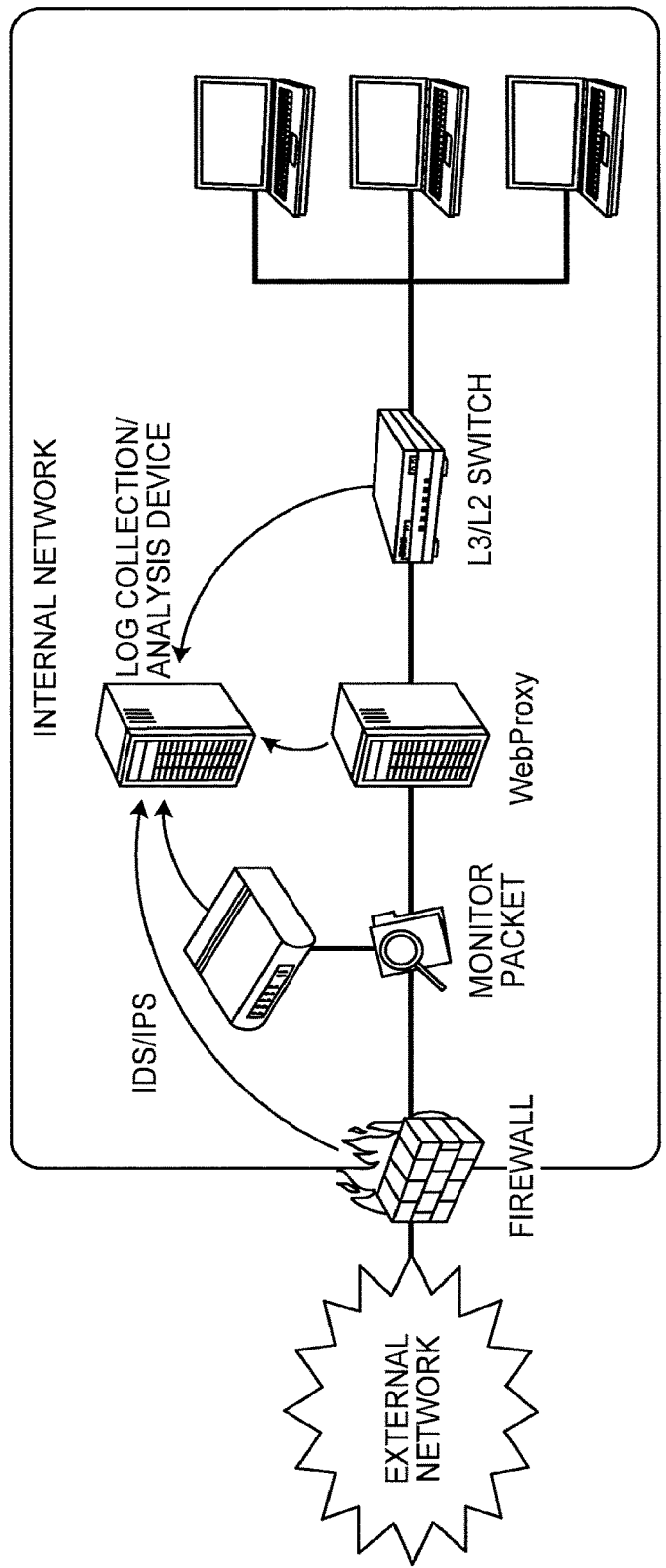
FIG. 20 is a diagram illustrating an example of a defensive technique against malicious communication, according to a related art.

As with a log collection/analysis device illustrated in FIG. 20, for example, the analysis rule adjustment system 1 is connected to an internal network, collects and analyzes communication information, and defends the network against malicious communication. The analysis rule adjustment system 1 is also connected to an external network transmitting an IP packet and an Ethernet (registered trademark) frame, and includes the Web proxy and FW for the purpose of filtering communication, for example. Note that the analysis rule adjustment system 1 may also be adapted not to be connected to the external network but acquire data on the malignant log and the benign log from another device connected to the external network. Moreover, the analysis rule adjustment system 1 may be implemented as a management device managing quality of a network by using a flow measuring technique. The analysis rule adjustment system 1 may for example be implemented while incorporated into a management device that detects degradation in quality by monitoring a Layer 2 bridge network and a Layer 3 network including a transfer device transmitting/receiving a packet.

[Configuration of Log Collecting/Accumulating Device 10]

The log collecting/accumulating device 10 takes in and collects the malignant log and the benign log through the appliances such as the Web proxy and FW. The log collecting/accumulating device 10 also normalizes and stores each of the malignant log and the benign log being collected.

The log collecting/accumulating device 10 includes a log collection unit 110, a log normalization unit 120 and a log storage unit 130. The log collection unit 110 collects the malignant log and the benign log through the Web proxy and FW. At this time, the log collection unit 110 may be set to receive in advance a command from a log acquisition unit 210 (to be described), a log analysis unit 220 (to be described) and the like and select the form and details of a log to be collected. The log collection unit 110 may also be configured to acquire only a log satisfying a predetermined condition. The log collection unit 110 may, for example, be configured to acquire only a log having a time stamp within a predetermined period of time. A specific mode of the log collection unit 110 is not particularly limited as long as it is configured to be able to acquire the two types of logs, namely the malignant log and the benign log.

The log normalization unit 120 formats the log collected by the log collection unit 110 into a form appropriate for succeeding processing. The log normalization unit 120 extracts information for each item illustrated in FIG. 2 and organizes the log in a form illustrated in FIG. 5, for example. FIG. 5 is a table illustrating an example of the log normalized by the log collecting/accumulating device 10 according to the first embodiment.

The log storage unit 130 stores the log normalized by the log normalization unit 120. The log storage unit 130 for example stores information of the log in which information including 5-tuple information (the destination IP address, the source IP address, a destination port, a source port and a protocol) of a packet passing through the FW or Web proxy, a connection time of communication, a connection result, a transmitted/received size of the packet, URL information of an access destination and the time stamp is normalized.

[Configuration of Analysis Rule Adjustment Device 20]

The analysis rule adjustment device 20 adjusts the analysis rule on the basis of the log collected and accumulated by the log collecting/accumulating device 10. Specifically, the analysis rule adjustment device 20 performs parameter tuning that adjusts the threshold set to the parameter used in the analysis rule.

The analysis rule adjustment device 20 includes a log acquisition unit 210, a log analysis unit 220, an analysis result analyzing unit 230, and a feedback unit 240. The analysis rule adjustment device 20 further includes an analysis rule storage unit 251, a tuning setting information storage unit 252, and an analysis result storage unit 253.

The log acquisition unit 210 transmits a log data request to the log storage unit 130 of the log collecting/accumulating device 10. The log acquisition unit 210 then acquires the log from the log storage unit 130. The timing at which the log acquisition unit 210 transmits the log data request is not particularly limited. The timing may be set such that the log acquisition unit 210 transmits the log data request every time a predetermined time elapses, for example. The log acquisition unit 210 may also be configured to transmit the log data request when the analysis rule adjustment system 1 receives an instruction input by an operator from outside.

The log analysis unit 220 performs an analysis by applying predetermined analysis rule and tuning condition to the log acquired by the log acquisition unit 210. The analysis rule and the tuning condition are stored in the analysis rule storage unit 251 and the tuning setting information storage unit 252, respectively (refer to FIGS. 6 and 7 to be described).

The log analysis unit 220 applies, as the analysis rule, a rule that a source IP address of a terminal presumed to be infected with malware is detected, for example. The log analysis unit 220 for example applies an analysis rule that a terminal with a source IP address performing communication with the same destination IP address for more than "X" times in five minutes is detected as the terminal infected with the malware. In this analysis rule, the number of times a certain source IP address communicates with a specific destination IP address is the parameter, while "X" is the threshold thereof.

Here, it is assumed that the log analysis unit 220 applies a tuning condition stating "the threshold falls within the range of 10 to 50", "the threshold is adjusted at an interval of two", and "a tolerance of a false detection rate is 0.5%". In this case, the log analysis unit 220 first applies the analysis rule and analyzes the log when the threshold "X" is "10". The log analysis unit 220 then calculates the false detection rate for the benign log and a detection rate for the malignant log on the basis of the analysis result.

Here, the false detection rate is a value obtained as a result of the analysis performed by the log analysis unit 220 on the benign log, the value including a numerator that is the number of source IP addresses detected by the analysis rule and a denominator that is the total number of the source IP addresses included in the benign log. The detection rate is a value obtained as a result of the analysis performed by the log analysis unit 220 on the malignant log, the value including a numerator that is the number of source IP addresses detected by the analysis rule and a denominator that is the total number of the source IP addresses included in the malignant log. Note that all the source IP addresses included in the malignant log are the source IP addresses of the terminal infected with the malware.

After calculating the false detection rate and the detection rate when "X=10", the log analysis unit 220 proceeds to calculate a false detection rate and a detection rate when "X=12" according to the tuning condition. The log analysis unit 220 calculates a false detection rate and a detection rate for each "X" within the predetermined range of thresholds, namely "10 to 50", while changing the value of "X" by two in each calculation. The log analysis unit 220 outputs the analysis result obtained in the aforementioned manner to the analysis result analyzing unit 230. The analysis result is also stored in the analysis result storage unit 253 (refer to FIG. 8 to be described).

The analysis result analyzing unit 230 analyzes the analysis result output from the log analysis unit 220, selects a threshold that best satisfies the tuning condition, and outputs the threshold as a recommended tuning value. In a case illustrated in FIGS. 6 to 8, for example, the analysis result analyzing unit 230 selects a threshold with the highest detection rate from among thresholds with which the false detection rate equals 0.5% or lower. A mode of selecting the recommended tuning value by the analysis result analyzing unit 230 is not particularly limited.

The feedback unit 240 updates setting of the analysis rule stored in the analysis rule storage unit 251 on the basis of the recommended tuning value selected by the analysis result analyzing unit 230. There is assumed a case analysis result analyzing unit 230 selects "30" as the recommended tuning value for an analysis rule to which "rule number: 001" is assigned. In this case, the feedback unit 240 receives the recommended tuning value "30" from the analysis result analyzing unit 230. The feedback unit 240 then updates data in the analysis rule storage unit 251 on the basis of the recommended tuning value "30" being received.

Although not illustrated in the figure, the analysis rule adjusted by the analysis rule adjustment system 1 is used by another communication monitoring device or the like connected to the analysis rule adjustment system 1 to analyze a behavior of communication. Alternatively, a device monitoring a network with use of the analysis rule may be configured integrally with the analysis rule adjustment system 1.

[Information Stored in Various Storage Units]

Figures 8, 9:
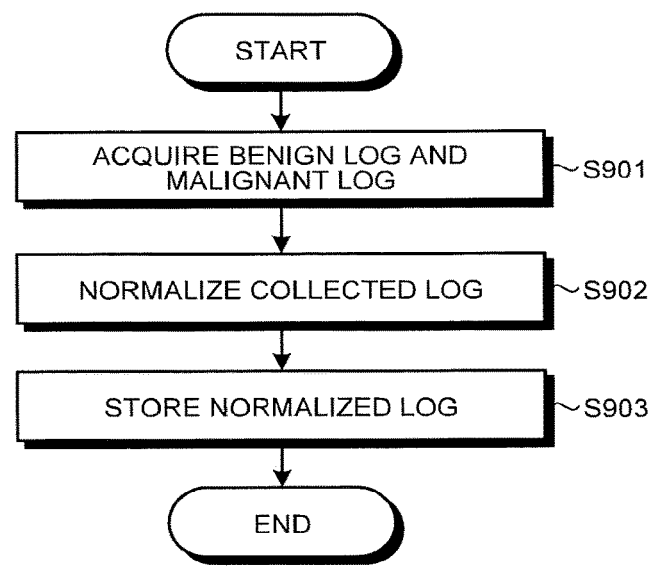
FIG. 8 is a table illustrating an example of an analysis result obtained as a result of a log analysis according to the first embodiment.
FIG. 9 is a flowchart illustrating an example of the flow of log collecting/accumulating processing according to the first embodiment.

The analysis rule storage unit 251, the tuning setting information storage unit 252, and the analysis result storage unit 253 store information as illustrated in FIGS. 6 to 8, respectively.

FIG. 6 is a table illustrating an example of the analysis rule according to the first embodiment. Information on the analysis rule as illustrated in FIG. 6 is stored in the analysis rule storage unit 251. FIG. 6 illustrates an example where the analysis rule with the "rule number: 001" is applied to "detect a source IP address performing communication with a single destination for a number of times in a certain period of time". The example further illustrates that "the number of appearances in five minutes" is used as a parameter in the analysis rule with the "rule number: 001". An "applied threshold" applied to the parameter at this point is "40" in the example illustrated.

FIG. 7 is a table illustrating an example of the tuning setting information according to the first embodiment. Information on the tuning condition (tuning setting information) as illustrated in FIG. 7 is stored in the tuning setting information storage unit 252. FIG. 7 illustrates an example where "the threshold falls within the range of 10 to 50", "the threshold is adjusted at the interval of two", and "the tolerance of the false detection rate is 0.5% or lower" are stored as tuning setting information with "condition number: 001". The example further illustrates that the tuning condition with the "condition number: 001" is applied to the analysis rule with the rule number "001".

FIG. 8 is a table illustrating an example of the analysis result obtained as a result of the log analysis according to the first embodiment. The analysis result as illustrated in FIG. 8 is stored in the analysis result storage unit 253. An example in FIG. 8 illustrates the analysis result for "applied rule number: 001" and "tuning setting condition: 001". That is, there is illustrated the analysis result when the analysis rule with the "rule number: 001" is used, and a tuning condition with "condition number: 001" among the tuning conditions is applied. Specifically, the example illustrates the "false detection rate" and the "detection rate" that are calculated when "the number of appearances in five minutes" being the parameter of the analysis rule is "10", "12", "14" and the like.

Note that while FIGS. 6 to 8 illustrate information in the form matching the specific analysis rule, tuning condition and analysis result, the analysis rule, the tuning condition and the analysis result may also be stored in another form.

Each of the various storage units illustrated in FIG. 1 is a storage device such as a hard disk or an optical disk, or a semiconductor memory device such as a RAM (Random Access Memory) or a flash memory, and stores various data and programs processed by the analysis rule adjustment system 1. While each storage unit is illustrated as a separate component in FIG. 1, the storage unit may also be integrated with another storage unit.

[Example of Flow of Log Collecting/Accumulating Processing in First Embodiment]

FIG. 9 is a flowchart illustrating an example of the flow of log collecting/accumulating processing according to the first embodiment. The example of the flow of the log collecting/accumulating processing according to the first embodiment will be described with reference to FIG. 9.

First, the log collection unit 110 of the log collecting/accumulating device 10 acquires the benign log and the malignant log through the Web proxy and FW (step S901). The log collection unit 110 passes the collected log one by one to the log normalization unit 120. The log normalization unit 120 performs normalization to format the collected log in a form suitable for succeeding processing (step S902). The normalized log is stored in the log storage unit 130 (step S903). This completes the log collecting/accumulating processing. Note that a log is assumed to be accumulated successively while the log collecting/accumulating processing is performed continuously. Depending on the setting of the malware generating the malignant log, however, the log collecting/accumulating processing may be started upon receiving an instruction from the log analysis unit 220 or another functional unit and be completed at a time specified by an instruction.

[Example of Flow of Analysis Rule Adjustment Processing in First Embodiment]

Figure 10:
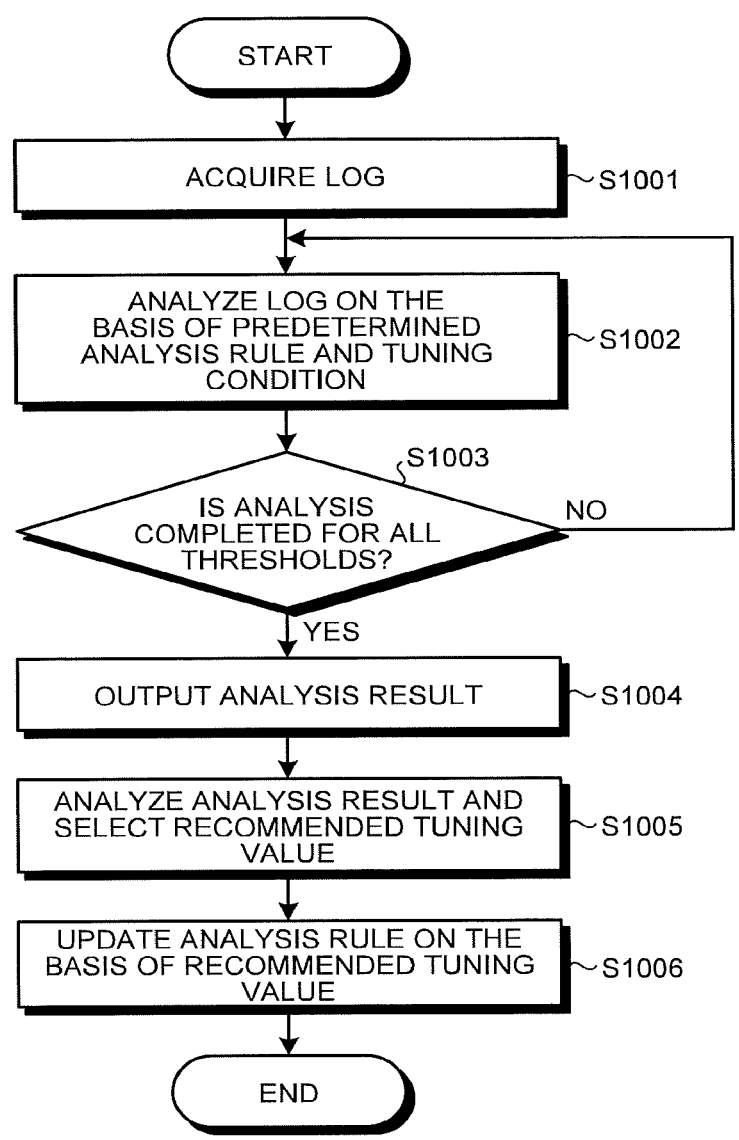
FIG. 10 is a flowchart illustrating an example of the flow of analysis rule adjustment processing according to the first embodiment.

FIG. 10 is a flowchart illustrating an example of the flow of analysis rule adjustment processing according to the first embodiment. The example of the flow of the analysis rule adjustment processing according to the first embodiment will be described with reference to FIG. 10.

When the analysis rule adjustment processing is started, the log acquisition unit 210 first transmits the log data request to the log storage unit 130. The log storage unit 130 transmits a log to the log acquisition unit 210 in response to the log data request (step S1001).

The log acquisition unit 210 passes the received log to the log analysis unit 220. The log analysis unit 220 analyzes the log on the basis of predetermined analysis rule and tuning condition (step S1002). Specifically, the log analysis unit 220 uses the analysis rule and detects malicious communication while changing the parameter within the range of thresholds set by the tuning condition. The log analysis unit 220 detects malicious communication for each of the benign log and the malignant log by using the analysis rule. Next, the log analysis unit 220 determines whether or not the log analysis is completed for all the thresholds (step S1003). When determining that the log analysis is not yet completed for all the thresholds (No in step S1003), the log analysis unit 220 selects a threshold not yet subjected to the analysis and continues the log analysis. When determining that the log analysis is completed for all the thresholds (Yes in step S1003), the log analysis unit 220 outputs an analysis result acquired (step S1004).

The output analysis result is passed on to the analysis result analyzing unit 230. The analysis result analyzing unit 230 analyzes the analysis result while referring to the tuning condition and selects a recommended tuning value (step S1005). When "the false detection rate equals 0.5% or lower" is specified in the tuning condition, for example, a threshold with the highest detection rate is selected from among the thresholds with which the false detection rate equals 0.5% or lower.

The analysis result analyzing unit 230 transmits the recommended tuning value being selected to the feedback unit 240. The feedback unit 240 updates the applied threshold of the analysis rule stored in the analysis rule storage unit

251 on the basis of the recommended tuning value (step S1006). This completes the analysis rule adjustment processing.

[Effect of First Embodiment]

As described above, the analysis rule adjustment system 1 according to the first embodiment adjusts the analysis rule used in the communication log analysis performed to detect the malicious communication through a network. The analysis rule adjustment system 1 includes a log storage device that acquires, normalizes and stores the communication log through the network to be defended and the communication log generated by the malware, and the analysis rule adjustment device that analyzes the communication log stored in the log storage device and adjusts the analysis rule. The analysis rule adjustment device includes the log acquisition unit that acquires the communication log from the log storage device, the log analysis unit that analyzes the communication log acquired by the log acquisition unit on the basis of the predetermined analysis rule and the tuning condition, and a first analysis unit (the analysis result analyzing unit) that analyzes the analysis result by the log analysis unit and calculates the recommended tuning value satisfying the tuning condition and used to adjust the predetermined analysis rule. As a result, the analysis rule adjustment system 1 can optimize the analysis rule by automatically and efficiently verifying validity of the analysis rule.

Moreover, the analysis rule adjustment system 1 adjusts the analysis rule on the basis of both the malignant log and the benign log, and can thus perform the adjustment based on more accurate false detection rate and detection rate and optimize the analysis rule. The analysis rule adjustment system 1 can further perform parameter tuning while grasping a correlation between the detection rate and the false detection rate. Moreover, the analysis rule adjustment system 1 uses the malignant log to be able to accurately verify the validity of the analysis rule.

The analysis rule adjustment system 1 calculates the false detection rate and the detection rate with respect to the threshold range set in the tuning condition as a target of the analysis. As a result, the system need not perform an analysis on an unnecessary threshold range and the like to thus be able to increase the efficiency of processing. The interval of the threshold to be analyzed can also be set in the tuning condition, whereby the analysis rule adjustment system 1 can further avoid time and effort to perform unnecessary processing and increase the efficiency of processing.

The analysis rule adjustment system 1 further includes the feedback unit that updates the predetermined analysis rule on the basis of the recommended tuning value calculated by the analysis result analyzing unit. As a result, the analysis rule adjustment system 1 can adapt the analysis rule to a target network on the basis of the recommended tuning value calculated from the analysis result of both the benign log and the malignant log. The analysis rule adjustment system 1 can therefore create a more precise analysis rule adapted to each network.

[Variation of First Embodiment]

The first embodiment described above may be adapted to adjust the threshold set to the parameter of a plurality of the analysis rules simultaneously. Moreover, for example, analyses based on the plurality of analysis rules may be performed simultaneously to calculate the false detection rate and the detection rate for each analysis and calculate an optimal threshold. In this case, the analysis rule adjustment system 1 is to calculate a plurality of recommended tuning values simultaneously.

According to the present variation, the analysis rule adjustment system performs parameter tuning on the plurality of analysis rules simultaneously to be able to further increase the efficiency of processing.

(Second Embodiment)

The analysis rule adjustment system 1 of the first embodiment analyzes the log on the basis of the predetermined analysis rule and tuning condition, selects the recommended tuning value by analyzing the analysis result, and updates the analysis rule on the basis of the recommended tuning value. On the other hand, an analysis rule adjustment system 2 of a second embodiment acquires an analysis result of a log analysis performed on the basis of a plurality of analysis rules and tuning conditions, and performs an adjustment among the plurality of analysis rules. That is, the analysis rule adjustment system 2 of the second embodiment acquires a recommended tuning value for each analysis rule included in a set of analysis rules and sample identification information identifying a sample detected when the recommended tuning value is applied. The analysis rule adjustment system 2 of the second embodiment then performs an adjustment to reduce the number of analysis rules included in an analysis rule set on the basis of the recommended tuning value and the sample identification information, and updates the analysis rule set. The analysis rule set refers to a combination of the plurality of analysis rules used in the analysis.

The analysis rule adjustment system 2 of the second embodiment also outputs, as the analysis result, the sample identification information identifying a detected sample that is detected by a log analysis performed on the basis of each analysis rule included in a predetermined analysis rule set and the tuning condition. The detected sample refers to a terminal infected with malware, the terminal being detected as a result of the log analysis. The sample identification information is, for example, a source IP address of the terminal infected with the malware, the terminal being detected as a result of the log analysis. The analysis rule adjustment system 2 then analyzes the sample identification information for each analysis rule included in the predetermined analysis rule set on the basis of a predetermined condition and reduces the number of analysis rules included in the analysis rule set.

The analysis rule adjustment system 2 for example compares the detected samples detected by the analysis rules and, when there exists an analysis rule by which only a detected sample identical to the detected sample detected by another analysis rule is detected, excludes that analysis rule from the analysis rule set. Moreover, for example, the analysis rule adjustment system 2 excludes from the analysis rule set an analysis rule by which the sample being lower than a threshold in ratio is detected among the detected samples detected by the whole analysis rule set.

[Example of Configuration of Analysis Rule Adjustment System 2 According to Second Embodiment]

Figure 11:
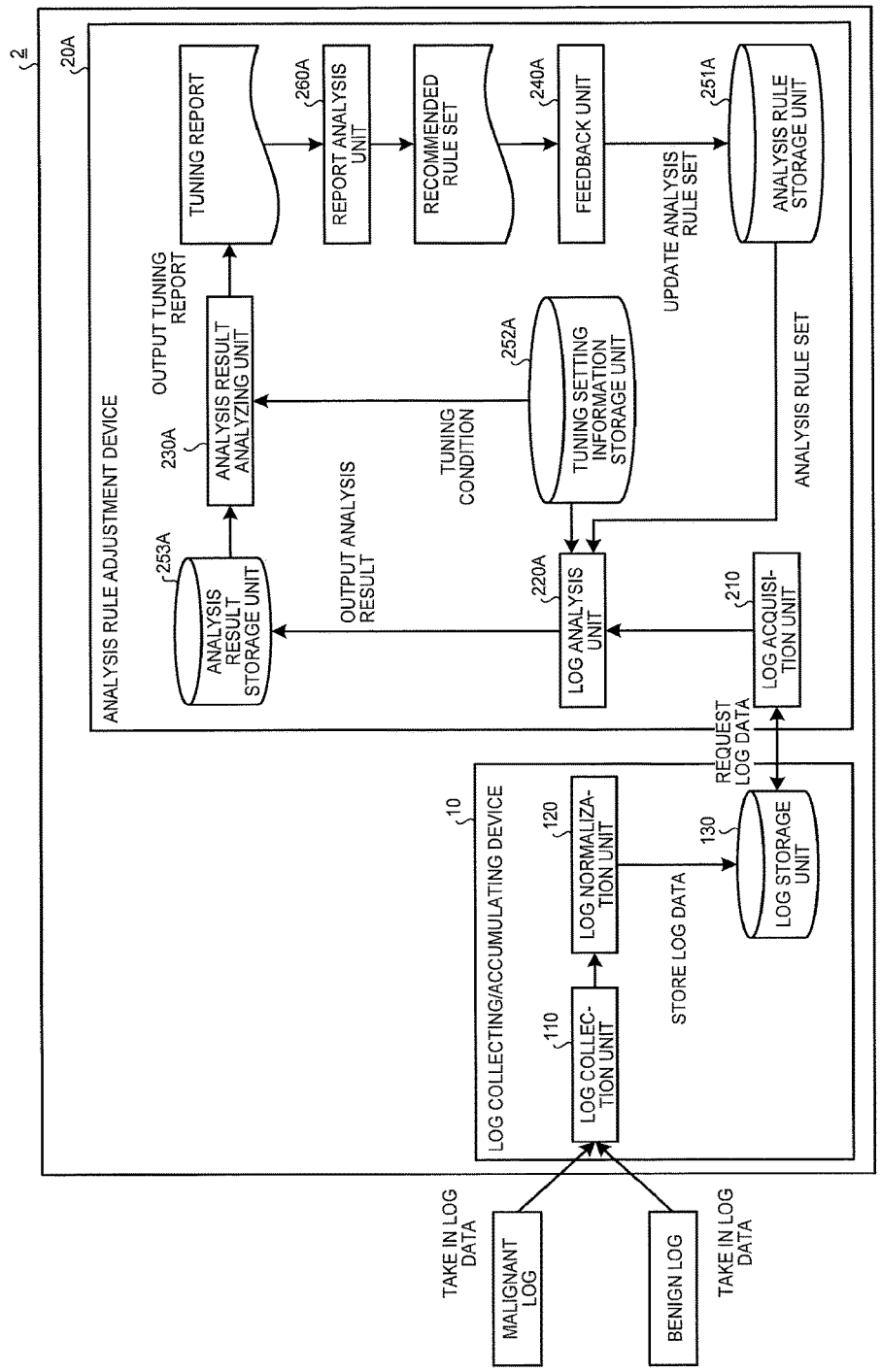
FIG. 11 is a diagram illustrating an overview of an analysis rule adjustment system according to a second embodiment.

FIG. 11 is a diagram illustrating an overview of the analysis rule adjustment system 2 according to the second embodiment. The configuration of the analysis rule adjustment system 2 is similar to that of the analysis rule adjustment system 1 of the first embodiment for the most part. The configuration and function similar to those of the first embodiment will not be described below.

The analysis rule adjustment system 2 includes a log collecting/accumulating device 10 and an analysis rule adjustment device 20A. The configuration and function of the log collecting/accumulating device 10 are similar to those of the first embodiment.

The analysis rule adjustment device 20A includes a log acquisition unit 210, a log analysis unit 220A, an analysis result analyzing unit 230A, and a feedback unit 240A. The analysis rule adjustment device 20A further includes a report analysis unit 260A. Moreover, the analysis rule adjustment device 20A includes an analysis rule storage unit 251A, a tuning setting information storage unit 252A, and an analysis result storage unit 253A.

The configuration and function of the log acquisition unit 210 are similar to those of the log acquisition unit 210 of the first embodiment.

The configuration and function of the log analysis unit 220A are also similar to those of the log analysis unit 220 of the first embodiment. Note however that the log analysis unit 220A is also adapted to receive an input of the analysis rule set from the analysis rule storage unit 251A and analyze a communication log on the basis of the plurality of analysis rules included in the analysis rule set. The log analysis unit 220A also reads the tuning setting information, namely the tuning condition, corresponding to each of the plurality of analysis rules from the tuning setting information storage unit 252A and uses the condition in the analysis.

Moreover, the log analysis unit 220A collectively outputs an analysis results to which each of the plurality of analysis rules is applied. The log analysis unit 220A also outputs information on a sample detected as a result of the analysis based on each analysis rule and tuning condition. In other words, the log analysis unit 220A can output sample identification information, which uniquely identifies a terminal infected with malware, in association with predetermined analysis rule and tuning condition by which the terminal is detected.

FIG. 12 is a table illustrating an example of an analysis result obtained as a result of a log analysis according to the second embodiment. In the example illustrated in FIG. 12, "applied threshold: 10", "false detection rate: 50%" and "detection rate: 20%" are stored in association with an analysis rule identified by "001" and a tuning condition identified by "001". Also stored are "detected samples: 51234, 50032, 34567" and "malware identifier: M100". This indicates that samples detected by analyzing a log with use of the analysis rule "001" and the tuning condition "001" are samples, namely terminals, that are identified by the sample identification information "51234, 50032, 34567". The example also indicates that the detected samples are of the type identified by "M100". The malware identifier is acquired from information included in the log as illustrated in the example of the malignant log in FIG. 4, for example.

In the second embodiment, the log analysis unit 220A outputs the log analysis result while including therein the sample identification information on the sample detected as the terminal infected with the malware and the information on the malware, as described above. The output analysis result is stored in the analysis result storage unit 253A.

The configuration and function of the analysis result storage unit 253A are similar to those of the analysis result storage unit 253. Note that, as described above, the analysis result storage unit 253A also stores the sample identification information and the malware identifier output from the log analysis unit 220A as the analysis result.

The analysis result analyzing unit 230A has the configuration and function similar to those of the analysis result analyzing unit 230 of the first embodiment. That is, the analysis result analyzing unit 230A analyzes the analysis result that is stored in the analysis result storage unit 253A and based on a predetermined analysis rule set to calculate a recommended tuning value for each analysis rule. The analysis result analyzing unit 230A then outputs, as a tuning report, the recommended tuning value being calculated and sample identification information detected when the recommended tuning value is applied.

An example of the tuning report output by the analysis result analyzing unit 230A is illustrated in FIG. 13. FIG. 13 is a table illustrating the example of the tuning report according to the second embodiment. As illustrated in FIG. 13, the tuning report according to the second embodiment includes the recommended tuning value, the sample identification information, and the malware identifier. In association with an applied analysis rule number "013" and a tuning setting condition "015", a recommended tuning value "30" calculated for the analysis rule is output, for example. Also output are a false detection rate "0.1%" and a detection rate "70%" when the recommended tuning value "30" is applied. Moreover, the detected samples (sample identification information) "51234, 50032, 34567" and a malware identifier "M110" for samples detected when the recommended tuning value "30" is applied are output. For each analysis rule, the analysis result analyzing unit 230A of the second embodiment not only calculates the recommended tuning value but also outputs the information on the sample detected when the recommended tuning value is applied.

The report analysis unit 260A receives an input of the tuning report output from the analysis result analyzing unit 230A, analyzes the tuning report, and outputs a recommended rule set obtained by reducing the number of analysis rules included in the analysis rule set. Processing performed by the report analysis unit 260A will be described in detail later on.

The configuration and function of the feedback unit 240A are similar to those of the feedback unit 240 of the first embodiment. Note that the feedback unit 240A updates not the individual analysis rules but the analysis rule set stored in the analysis rule storage unit 251A. That is, the feedback unit 240A updates the analysis rule set stored in the analysis rule storage unit 251A on the basis of the recommended rule set.

The analysis rule storage unit 251A stores information on the analysis rule set in addition to the information stored in the analysis rule storage unit 251 of the first embodiment (refer to FIG. 6). The analysis rule storage unit 251A stores an analysis rule set applied in a predetermined network environment together with an identifier identifying the analysis rule set, for example.

The storage unit also stores a threshold applied to the analysis rule set.

FIG. 14 is a table illustrating an example of the analysis rule set stored in the analysis rule storage unit 251A according to the second embodiment. As illustrated in FIG. 14, the analysis rule storage unit 251A stores "set number", "rule set", "threshold", and "applied environment". The "set number" is an identifier uniquely identifying the analysis rule set. The "rule set" is information specifying the analysis rule included in the analysis rule set. The "threshold" is a threshold value applied to each analysis rule included in the analysis rule set. The "applied environment" is an environment such as a network environment in which the analysis rule set is used.

In the example illustrated in FIG. 14, "rule set: 001, 005, 110", "thresholds: 10, 5, 1000" and "applied environment: NW005" are stored in association with "set number: 001". This indicates that the thresholds "10, 5, 1000" are set to three analysis rules identified by "001, 005, 110" and included in the analysis rule set "001". The example further indicates that the analysis rule set "001" is applied to a network identified by "NW005".

Information stored in the tuning setting information storage unit 252A is similar to the information stored in the tuning setting information storage unit 252 of the first embodiment.

The analysis result stored in the analysis result storage unit 253A includes the sample identification information and the malware identifier in addition to the analysis result according to the first embodiment, as described earlier. In other respects, the configuration is similar to that of the first embodiment.

[Example of Flow of Analysis Rule Adjustment Processing in Second Embodiment]

Figure 15:
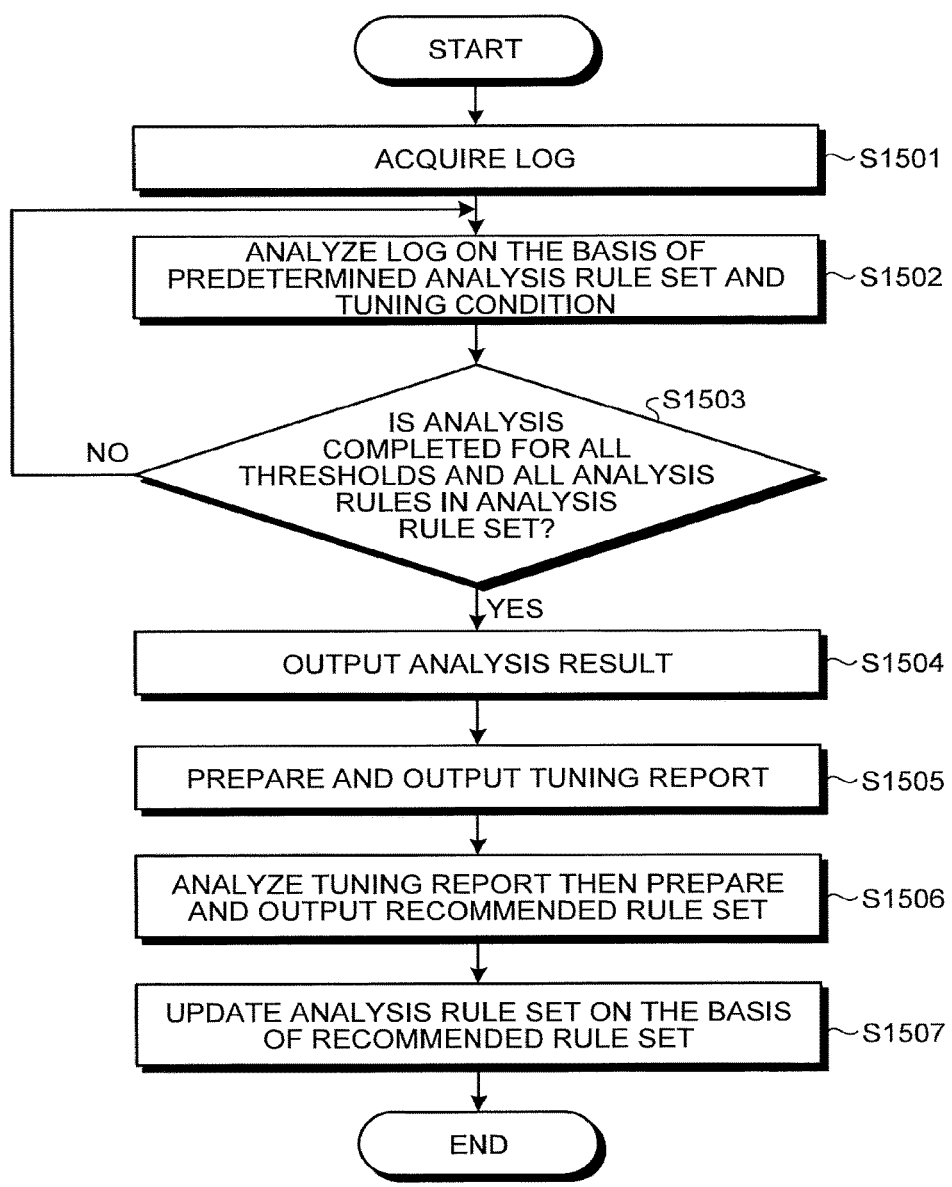
FIG. 15 is a flowchart illustrating an example of the flow of analysis rule adjustment processing according to the second embodiment.

FIG. 15 is a flowchart illustrating an example of the flow of analysis rule adjustment processing according to the second embodiment. The example of the flow of the analysis rule adjustment processing according to the second embodiment will be described with reference to FIG. 15.

First, the log acquisition unit 210 acquires a log (step S1501). The log analysis unit 220A then analyzes the log on the basis of predetermined analysis rule set and tuning condition (step S1502). What is different from the first embodiment is that the log analysis unit 220A performs an analysis not on each analysis rule but collectively on a plurality of analysis rules included in the analysis rule set.

Then, the log analysis unit 220A determines whether or not the analysis is completed for all thresholds and all the analysis rules on the basis of the predetermined analysis rule set and tuning condition (step S1503). The processing goes back to step S1502 when the analysis is not completed for all the thresholds and analysis rules (No in step S1503). When determining that the analysis is completed for all the thresholds and analysis rules (Yes in step S1503), the log analysis unit 220A outputs an analysis result (step S1504). Then, on the basis of the analysis result, the analysis result analyzing unit 230A prepares and outputs a tuning report including a recommended tuning value and sample identification information for each analysis rule (step S1505).

The report analysis unit 260A analyzes the tuning report to create and output a recommended rule set obtained by reducing the number of analysis rules included in the analysis rule set (step S1506). The feedback unit 240A updates the analysis rule set stored in the analysis rule storage unit 251A on the basis of the recommended rule set (step S1507). This completes the analysis rule adjustment processing according to the second embodiment.

[Example of Flow of Recommended Rule Set Creation Processing]

Figure 16:
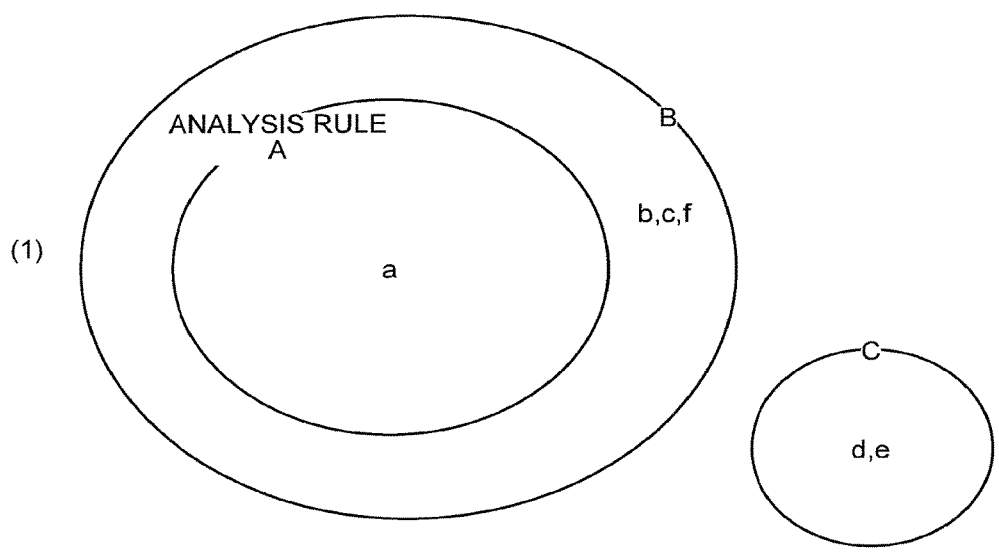
FIG. 16 is a set of diagrams illustrating recommended rule set creation processing according to the second embodiment.

Next, the processing of creating the recommended rule set as performed in step S1506 of FIG. 15 will be further described. FIG. 16 is a set of diagrams provided to describe the recommended rule set creation processing according to the second embodiment. The recommended rule set creation processing is performed by the report analysis unit 260A.

There will be described an example of creating a recommended rule set for an analysis rule set including analysis rules A, B, and C with reference to FIG. 16. FIG. 16 illustrates the example where a sample a is detected as a result of applying the analysis rule A. Samples a, b, c, and f are detected as a result of applying the analysis rule B. Samples d and e are detected as a result of applying the analysis rule C.

As illustrated in FIG. 16(1), the sample detected by the analysis rule A is all detected by the analysis rule B. In such case, the samples that can be detected by the entire analysis rule set is not affected even when the analysis rule A is deleted. That is, it can be said that a contribution by the analysis rule A to the entire analysis rule set concerning sample detection is small.

The number of analysis rules included in the analysis rule set can be reduced in this case. As illustrated in FIG. 16(2), there is no change in the samples detected when the analysis rule A is deleted. On the other hand, the number of samples detected decreases by half when the analysis rule B is deleted.

Accordingly, the report analysis unit 260A of the second embodiment considers the contribution by each analysis rule included in the analysis rule set to the entire analysis rule set concerning the sample detection, and creates a recommended rule set from which an analysis rule with the contribution smaller than a predetermined threshold is deleted. The analysis rule A is deleted when, for example, the sample that can be detected only by the analysis rule A corresponds to ten percent or less of the samples that can be detected by the entire analysis rule set. A method of calculating the contribution is not particularly limited.

In the second embodiment, the log analysis unit 220A performs the analysis based on the predetermined analysis rule set and outputs the analysis result. However, the log analysis unit 220A may also be adapted to perform the analysis as appropriate and store the analysis result in the analysis result storage unit 253A, for example. Then, when an instruction input or the like is received from a user, the analysis result analyzing unit 230A receives designation of an analysis rule set and reads, from the analysis result storage unit 253A, the analysis result based on an analysis rule included in the analysis rule set. The analysis result analyzing unit 230A and the report analysis unit 260A may then perform processing to create a recommended rule set. The recommended rule set may be output to the outside as well.

[Effect of Second Embodiment]

As has been described, the analysis rule adjustment device of the second embodiment is the device that adjusts the analysis rule used in analyzing the communication log to detect malicious communication through a network, and includes the log acquisition unit that acquires the communication log through the network to be defended and the communication log generated by the malware, the log analysis unit that analyzes the communication logs acquired by the log acquisition unit on the basis of the predetermined analysis rule and tuning condition, and the first analysis unit (analysis result analyzing unit) that analyzes the analysis result by the log analysis unit and calculates the recommended tuning value used in adjusting the predetermined analysis rule and satisfying the tuning condition. As a result, the analysis rule can be optimized by automatically and efficiently verifying validity of the analysis rule.

According to the analysis rule adjustment device of the second embodiment, the log analysis unit performs the analysis on the basis of each analysis rule included in the predetermined set of analysis rules, and the first analysis unit simultaneously analyzes the analysis result obtained by each analysis rule included in the predetermined set of analysis rules and calculates the recommended tuning value corresponding to each analysis rule included in the predetermined set of analysis rules. As a result, the plurality of analysis rules can be analyzed collectively to then cause each rule to be subjected to tuning.

Moreover, according to the analysis rule adjustment device of the second embodiment, the first analysis unit outputs the recommended tuning value as well as the sample identification information uniquely identifying the sample detected when the recommended tuning value is applied. This allows one to collectively analyze which sample can be detected by using which value to which analysis rule. As a result, the analysis rule can be optimized by automatically and efficiently verifying validity of the analysis rule. The analysis rule adjustment device of the second embodiment can also adjust the analysis rule while considering specifically which sample is detected by which analysis rule, thereby realizing the precise adjustment according to the applied environment.

The analysis rule adjustment device of the second embodiment further includes a second analysis unit (report analysis unit) that analyzes the recommended tuning value and the sample identification information output by the first analysis unit, where the first analysis unit outputs the recommended tuning value and the sample identification information for each analysis rule included in the predetermined set of analysis rules while the second analysis unit outputs the recommended rule set obtained by reducing the number of analysis rules included in the predetermined set of analysis rules on the basis of the sample identification information. As a result, the analysis rule set can be updated by excluding the analysis rule that contributes less to sample detection on the basis of the sample identification information, which contributes to reductions in the analysis time and resources required for the analysis processing.

The analysis rule adjustment device of the second embodiment further includes the storage unit that stores the analysis result by the log analysis unit, where the first analysis unit performs analyses with respect to different sets of analysis rules on the basis of the analysis result stored in the storage unit. That is, the result of the log analysis is accumulated one by one in the analysis result storage unit 253A, so that tuning using the same analysis result can be performed on the different analysis rule sets. As a result, the processing time required for the log acquisition and log analysis can be reduced to be able to efficiently perform the tuning.

Moreover, according to the analysis rule adjustment device of the second embodiment, the log analysis unit receives designation of a predetermined range of parameters as the tuning condition and analyzes the log with respect to the predetermined range designated. As a result, the time for tuning the analysis rule can be reduced to be able to efficiently perform the adjustment.

The analysis rule adjustment device of the second embodiment further includes the feedback unit that updates the predetermined analysis rule on the basis of the recommended tuning value calculated by the first analysis unit. As a result, the analysis rule stored in the analysis rule adjustment device is automatically updated to be able to efficiently perform the tuning.

(Third Embodiment)

The second embodiment is configured to calculate a single recommended tuning value for each analysis rule included in the analysis rule set and output the sample identification information corresponding to the recommended tuning value. In a third embodiment, on the other hand, a plurality of recommended tuning values is calculated for each analysis rule included in the analysis rule set.

A threshold determined to be optimal when the analysis rule is singly analyzed is not always the optimal threshold in a case where a plurality of analysis rules is used as a set. Thus, in the third embodiment, a threshold within a predetermined range is output as the recommended tuning value for each analysis rule, and an adjustment is performed among the plurality of analysis rules.

The configuration of an analysis rule adjustment device of the third embodiment is similar to that of the analysis rule adjustment device of the second embodiment illustrated in FIG. 11. Note that the configuration of a tuning report output by an analysis result analyzing unit and processing performed by a report analysis unit are different from those of the second embodiment. Moreover, the analysis rule adjustment device of the third embodiment is different from that of the first and second embodiments in that a set selection unit is included.

[Example of Configuration of Analysis Rule Adjustment System 3 According to Third Embodiment]

Figure 17:
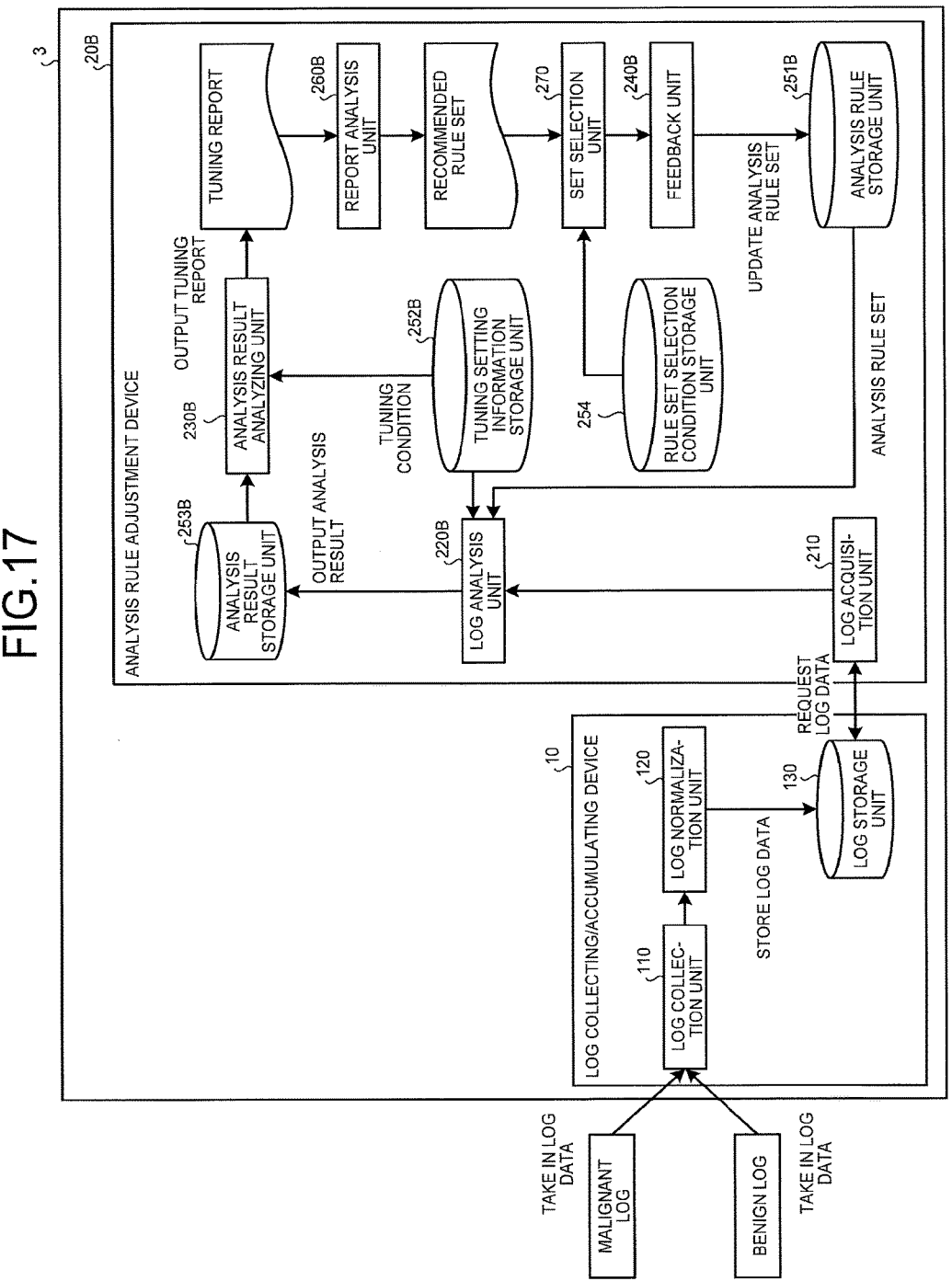
FIG. 17 is a diagram illustrating an overview of an analysis rule adjustment system according to a third embodiment.

FIG. 17 is a diagram illustrating an overview of an analysis rule adjustment system 3 according to the third embodiment. The configuration of the analysis rule adjustment system 3 is similar to that of the analysis rule adjustment system 2 of the second embodiment for the most part. The configuration and function similar to those of the second embodiment will not be described below.

The analysis rule adjustment system 3 includes a log collecting/accumulating device 10 and an analysis rule adjustment device 20B. The configuration and function of the log collecting/accumulating device 10 are similar to those of the first and second embodiments.

The analysis rule adjustment device 20B includes a log acquisition unit 210, a log analysis unit 220B, an analysis result analyzing unit 230B, and a feedback unit 240B. The analysis rule adjustment device 20B further includes a report analysis unit 260B and a set selection unit 270. Moreover, the analysis rule adjustment device 20B includes an analysis rule storage unit 251B, a tuning setting information storage unit 252B, and an analysis result storage unit 253B. The analysis rule adjustment device 20B further includes a rule set selection condition storage unit 254.

The configuration and function of the log acquisition unit 210 are similar to those of the log acquisition unit 210 described in each of the first and second embodiments. The configuration and function of the log analysis unit 220B are similar to those of the log analysis unit 220A of the second embodiment. The configuration and function of the analysis result storage unit 253B are also similar to those of the analysis result storage unit 253A of the second embodiment.

In the third embodiment, the analysis result analyzing unit 230B analyzes an analysis result based on a predetermined analysis rule set to calculate a plurality of recommended tuning values for each analysis rule. That is, the analysis result analyzing unit 230B selects a plurality of values each as an applied threshold corresponding to a parameter used in each analysis rule.

The example in FIG. 7 includes a tuning condition stating that "a tolerance of a false detection rate equals 0.5% or lower". With such tuning condition being applied, it is assumed that a false detection rate is "0.1%" when an applied threshold equals "16", and a false detection rate is "0.3%" when an applied threshold equals "20". In this case, the analysis result analyzing unit 230B outputs not the applied threshold "16" associated with the lower false detection rate "0.1%" as a recommended tuning value but both of the applied thresholds "16" and "20" as recommended tuning values in a tuning report.

It is further assumed that a false detection rate is "0.6%" when an applied threshold equals "18", and a false detection rate is "0.4%" when an applied threshold equals "12". In this case as well, the analysis result analyzing unit 230B outputs both of the applied thresholds "12" and "18" as recommended tuning values in the tuning report.

That is, when there exists a plurality of applied thresholds satisfying the tuning condition, the analysis result analyzing unit 230B of the third embodiment selects a predetermined number of the plurality of applied thresholds and outputs them in the tuning report. When the number of the applied thresholds satisfying the tuning condition by itself does not reach the predetermined number, the analysis result analyzing unit 230B selects the predetermined number of applied thresholds by adding an applied threshold not satisfying the tuning condition and outputs them in the tuning report.

The analysis result analyzing unit 230B selects in order an applied threshold that does not satisfy the tolerance defined in the tuning condition but is closer to the tolerance, for example. Alternatively, the analysis result analyzing unit 230B selects in order an applied threshold satisfying a predetermined condition among the applied thresholds satisfying the tolerance defined in the tuning condition. When the tuning condition states that "the tolerance of the false detection rate equals 0.5% or lower", for example, the analysis result analyzing unit 230B selects the applied thresholds "in order from one with a value smaller than 0.5% until the number of applied thresholds reaches a predetermined number". When the tuning condition states that "a tolerance of a detection rate equals 80% or higher", the analysis result analyzing unit 230B selects the applied thresholds "in order from one with a value larger than 80% until the number of applied thresholds reaches a predetermined number". That is, when the tuning condition defines a lower limit value, the analysis result analyzing unit 230B selects and determines, as the recommended tuning value, a predetermined number of thresholds starting from one with a value larger than the lower limit value. When the tuning condition defines an upper limit value, the analysis result analyzing unit 230B selects and determines, as the recommended tuning value, a predetermined number of thresholds starting from one with a value smaller than the upper limit value.

The analysis result analyzing unit 230B prepares and outputs the tuning report including the plurality of recommended tuning values corresponding to each analysis rule, as described above. The tuning report prepared and output by the analysis result analyzing unit 230B is similar to the analysis result illustrated in FIG. 12 for the most part since the plurality of applied thresholds is associated with the analysis rule.

The report analysis unit 260B receives an input of the tuning report output from the analysis result analyzing unit 230B, analyzes the tuning report, and outputs a recommended rule set obtained by reducing the number of analysis rules included in the analysis rule set. The report analysis unit 260B is similar to the report analysis unit 260A of the second embodiment in this respect.

The tuning report to be analyzed by the report analysis unit 260B however includes a plurality of threshold candidates for each analysis rule. Accordingly, the report analysis unit 260B creates the recommended rule set for a combination of the plurality of analysis rules.

It is assumed, for example, that an analysis rule set including three analysis rules A, B and C is subjected to tuning. In this case, the tuning is performed on condition that three recommended tuning values are selected for each analysis rule. A tuning report being output as a result includes thresholds A1, A2, A3 to be candidates for the analysis rule A, thresholds B1, B2, B3 to be candidates for the analysis rule B, and thresholds C1, C2, C3 to be candidates for the analysis rule C. The report analysis unit 260B creates the recommended rule set by selecting the analysis rule to be deleted when each of the thresholds A1, A2, A3, the thresholds B1, B2, B3, and the thresholds C1 C2, C3 is combined. In creating the recommended rule set, the report analysis unit 260B performs a determination on the basis of sample identification information as with the second embodiment.

The set selection unit 270 selects an analysis rule set satisfying a predetermined condition from among the plurality of recommended rule sets created by the report analysis unit 260B. The set selection unit 270 for example selects the analysis rule set on the basis of a condition set in an operation policy of a security operation of a network to which the rule set is applied. Alternatively, the set selection unit 270 selects the analysis rule set with the largest number of detected samples from among the recommended rule sets, for example.

A condition used by the set selection unit 270 to select the analysis rule set is stored in the rule set selection condition storage unit 254.

The analysis rule set selected by the set selection unit 270 is input to the feedback unit 240B. The feedback unit 240B updates the analysis rule set stored in the analysis rule storage unit 251B on the basis of the selected rule set.

[Example of Flow of Analysis Rule Adjustment Processing in Third Embodiment]

Figure 18:
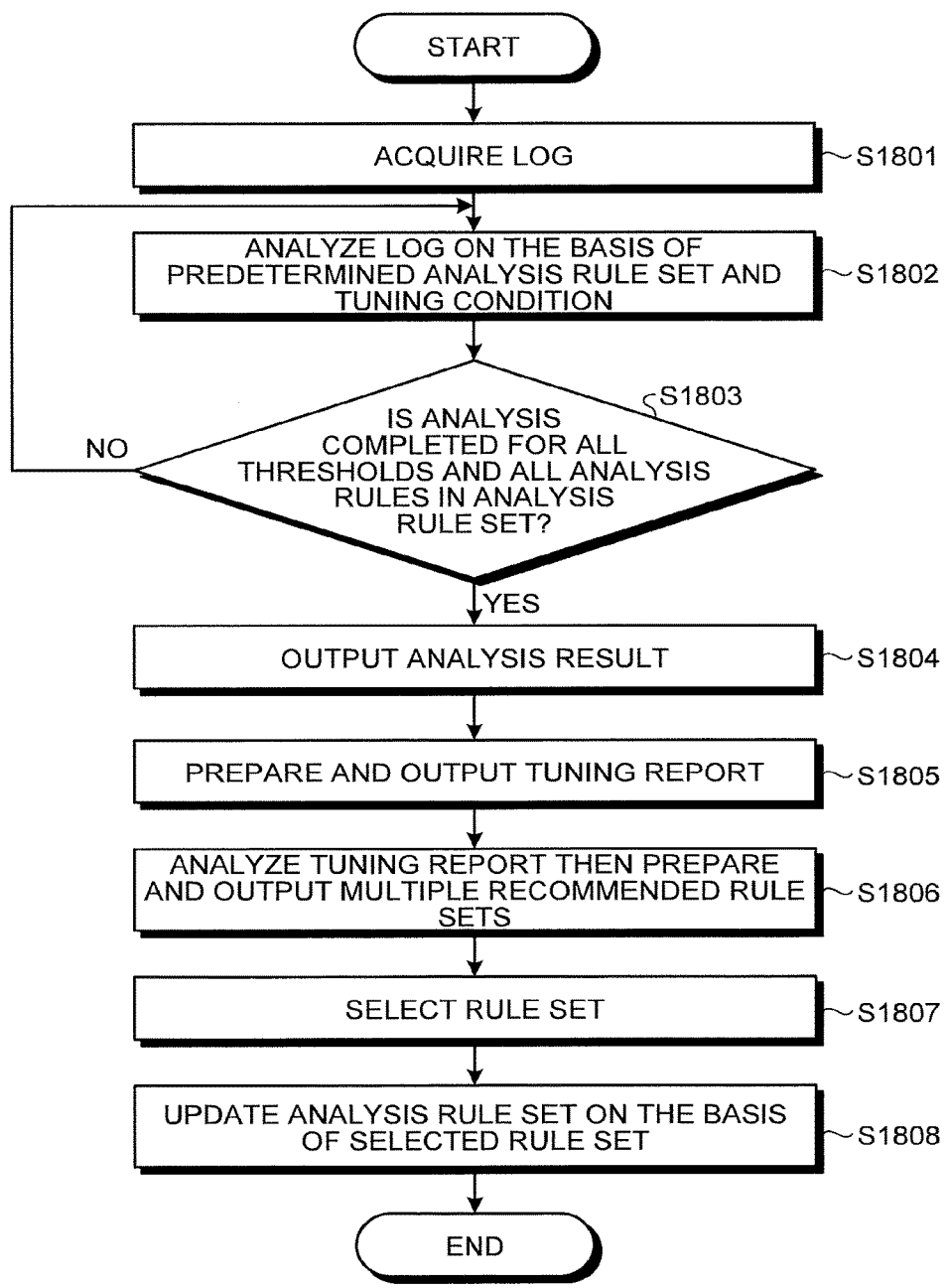
FIG. 18 is a flowchart illustrating an example of the flow of analysis rule adjustment processing according to the third embodiment.

FIG. 18 is a flowchart illustrating an example of the flow of analysis rule adjustment processing according to the third embodiment. The example of the flow of the analysis rule adjustment processing according to the third embodiment will be described with reference to FIG. 18.

Processing from step S1801 to step S1804 is similar to that illustrated in the flow of the analysis rule adjustment processing of the second embodiment illustrated in FIG. 15. That is, the log acquisition unit 210 acquires a log first (step S1801). The log analysis unit 220B then analyzes the log on the basis of predetermined analysis rule set and tuning condition (step S1802). Then, the log analysis unit 220B determines whether or not the analysis is completed for all thresholds and all the analysis rules on the basis of the predetermined analysis rule set and tuning condition (step S1803). The processing goes back to step S1802 when the analysis is not completed for all the thresholds or analysis rules (No in step S1803). When determining that the analysis is completed for all the thresholds and analysis rules (Yes in step S1803), the log analysis unit 220B outputs an analysis result (step S1804).

Next, upon receiving the analysis result, the analysis result analyzing unit 230B prepares and outputs a tuning report including a plurality of recommended tuning values and sample identification information for each analysis rule (step S1805). The report analysis unit 260B analyzes the tuning report to create and output a plurality of recommended rule sets (step S1806). The set selection unit 270 selects a rule set on the basis of a selection condition stored in the rule set selection condition storage unit 254 (step S1807). The feedback unit 240B updates the analysis rule set on the basis of the selected rule set (step S1808). This completes the analysis rule adjustment processing of the third embodiment.

[Effect of Third Embodiment]

The analysis rule adjustment device according to the third embodiment as configured above has the following effect in addition to the effects obtained by the analysis rule adjustment device of the second embodiment.

According to the analysis rule adjustment device of the third embodiment, the analysis result analyzing unit 230B selects the plurality of recommended tuning values and outputs them as the tuning report instead of outputting a single recommended tuning value for each analysis rule. This allows for more options at the time of performing an adjustment among the plurality of analysis rules to be able to adjust the analysis rule set more flexibly.

(Another Embodiment)

While some embodiments of the present invention have been described, the present invention may be implemented by another embodiment in addition to the aforementioned embodiments. The other embodiment will be described below.

[Preparation and Reuse of Detection Rate Table]

In the second embodiment, the analysis result by the log analysis unit 220A is stored in the analysis result storage unit 253A. It is described above that the analysis result may be reused to adjust the analysis rule included in different analysis rule sets. Moreover, among the analysis results prepared by the log analysis unit 220A, the analysis result of a malignant log may be used to prepare and store a detection rate table in a predetermined format such that the table can be reused.

[System Configuration and Others]

Each component of each device in the figures illustrates a functional concept of the component and need not always be physically configured as illustrated in the figures. That is, a specific form of distribution/integration of each device is not limited to what is illustrated in the figures, where all or a part of the device can be functionally or physically distributed/integrated by an arbitrary unit according to various loads and use conditions. The log analysis unit 220 and the analysis result analyzing unit 230 may be integrated together as well as the analysis rule may be acquired from another device to supply the recommended tuning value to the other device, for example.

Moreover, all or an arbitrary part of each processing function performed by each device can be implemented by a CPU and a program analyzed and executed by the CPU, or can be implemented as hardware by a wired logic.

Among the processings described in the present embodiment, all or a part of the processing described to be performed automatically can be performed manually, or all or a part of the processing described to be performed manually can be performed automatically by a known method. In addition, the processing procedure, control procedure, specific names, and information including various data and parameters illustrated in the document and figures can be modified at will unless otherwise specified.

[Program]

There can also be created a program in which the processing executed by the analysis rule adjustment systems 1, 2, 3 or the analysis rule adjustment devices 20, 20A, 20B described in the aforementioned embodiments is written in a language that can be executed by a computer. There can be created, for example, a program in which the processing executed by the analysis rule adjustment system 1 or the analysis rule adjustment device 20 of the first embodiment is written in a language that can be executed by a computer. In this case, the program is executed by the computer to be able to obtain the effect similar to that of the aforementioned embodiments. The program may also be recorded in a computer-readable recording medium and be read and executed by the computer to realize the processing similar to that of the first embodiment. There will now be described an example of the computer that executes a program implementing the function similar to that of the analysis rule adjustment systems 1, 2, 3 or the analysis rule adjustment devices 20, 20A, 20B.

Figure 19:
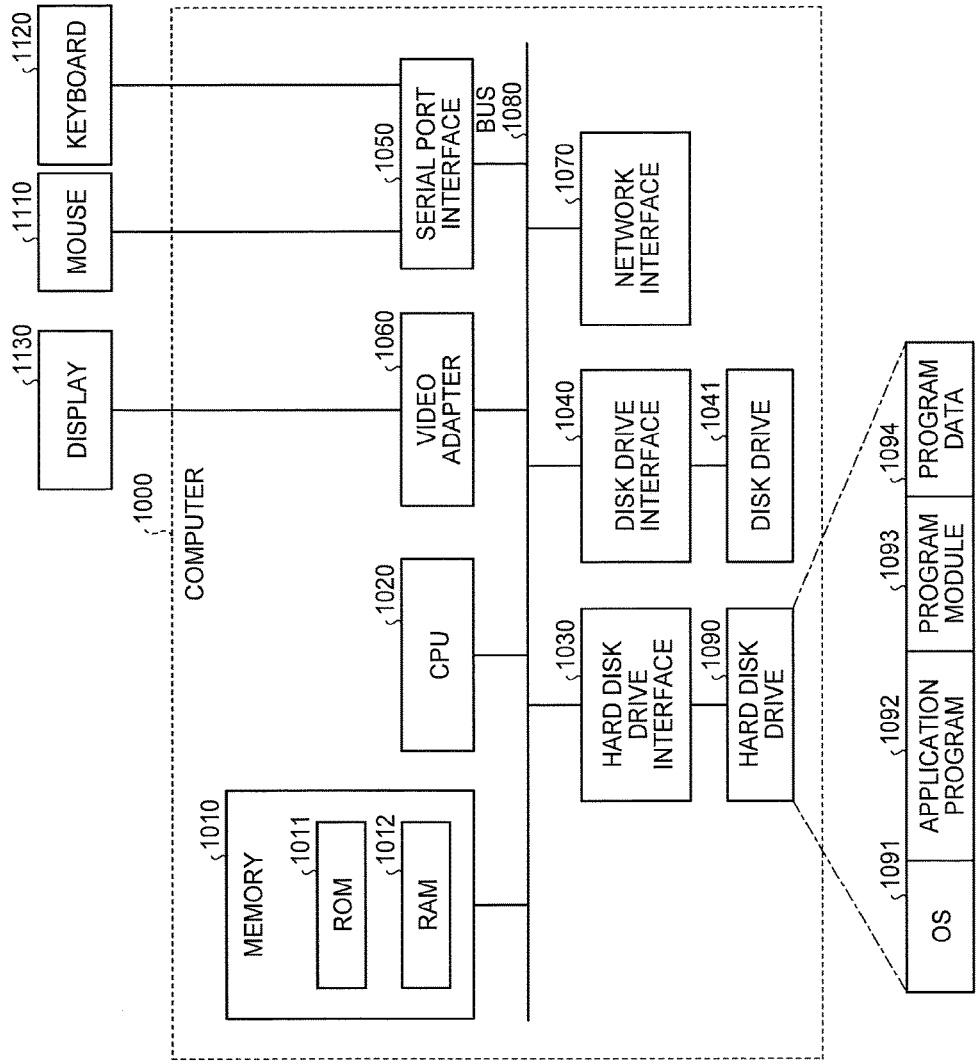
FIG. 19 is a diagram illustrating a computer that executes an analysis rule adjustment program.

FIG. 19 is a diagram illustrating a computer 1000 that executes an analysis rule adjustment program. As illustrated in FIG. 19, the computer 1000 includes a memory 1010, a CPU (Central Processing Unit) 1020, a hard disk drive interface 1030, a disk drive interface 1040, a serial port interface 1050, a video adapter 1060, and a network interface 1070, which are all connected by a bus 1080.

The memory 1010 includes a ROM (Read Only Memory) 1011 and a RAM (Random Access Memory) 1012 as illustrated in FIG. 19. The ROM 1011 stores a boot program such as a BIOS (Basic Input Output System), for example. The hard disk drive interface 1030 is connected to a hard disk drive 1090 as illustrated in FIG. 19. The disk drive interface 1040 is connected to a disk drive 1041 as illustrated in FIG. 19. A detachable storage medium such as a magnetic disk or an optical disk is inserted into the disk drive 1041. The serial port interface 1050 is connected to a mouse 1110 and a keyboard 1120 as illustrated in FIG. 19, for example. The video adapter 1060 is connected to a display 1130 as illustrated in FIG. 19, for example.

As illustrated in FIG. 19, the hard disk drive 1090 stores an OS (Operating System) 1091, an application program 1092, a program module 1093, and program data 1094, for example. That is, the aforementioned program is stored in the hard disk drive 1090 or the like as a program module in which a command executed by the computer 1000 is written.

Moreover, the various pieces of data described in the aforementioned embodiments are stored as program data in the memory 1010 and the hard disk drive 1090, for example. The CPU 1020 reads the program module 1093 and the program data 1094 stored in the memory 1010 and the hard disk drive 1090 into the RAM 1012 as needed and executes various process procedures.

Note that the program module 1093 and the program data 1094 pertaining to the program are not necessarily stored in the hard disk drive 1090 but may be stored in a detachable storage medium to be read by the CPU 1020 through the disk drive or the like, for example.

Alternatively, the program module 1093 and the program data 1094 pertaining to the program may be stored in another computer connected through a network (such as a LAN (Local Area Network) or a WAN (Wide Area Network)) to be read by the CPU 1020 through the network interface 1070.

REFERENCE SIGNS LIST 1, 2, 3 ANALYSIS RULE ADJUSTMENT SYSTEM
10 LOG COLLECTING/ACCUMULATING DEVICE
20, 20A, 20B ANALYSIS RULE ADJUSTMENT DEVICE
110 LOG COLLECTION UNIT
120 LOG NORMALIZATION UNIT
130 LOG STORAGE UNIT
210 LOG ACQUISITION UNIT
220, 220A, 220B LOG ANALYSIS UNIT
230, 230A, 230B ANALYSIS RESULT ANALYZING UNIT
240, 240A, 240B FEEDBACK UNIT
251, 251A, 251B ANALYSIS RULE STORAGE UNIT
252, 252A, 252B TUNING SETTING INFORMATION STORAGE UNIT
253, 253A, 253B ANALYSIS RESULT STORAGE UNIT
260A, 260B REPORT ANALYSIS UNIT
270 SET SELECTION UNIT

The invention claimed is:

1. An analysis rule adjustment device that adjusts an analysis rule used in analyzing a communication log to detect malicious communication through a network, the device comprising:
circuitry configured to implement:
a log acquisition unit that acquires a communication log through a network to be defended and a communication log generated by malware;
a log analysis unit that analyzes each of the communication logs acquired by the log acquisition unit on the basis of each analysis rule included in a predetermined set of analysis rules and a tuning condition, the predetermined set of analysis rules and the tuning condition being used to analyze the same communication log; and
a first analysis unit that analyzes an analysis result on the basis of each analysis rule included in the predetermined set of analysis rules of the log analysis unit and calculates a recommended tuning value corresponding to each analysis rule included in the predetermined set of analysis rules and used in an adjustment of the predetermined set of analysis rules and satisfying the tuning condition, the predetermined set of analysis rules that has been adjusted by the recommended tuning value preventing intrusion of malicious communication into the network.

2. The analysis rule adjustment device according to claim 1, wherein:
the first analysis unit simultaneously analyzes the analysis result.

3. The analysis rule adjustment device according to claim 1, wherein the first analysis unit outputs the recommended tuning value as well as sample identification information uniquely identifying a sample detected when the recommended tuning value is applied.

4. The analysis rule adjustment device according to claim 3, further comprising:
a second analysis unit, implemented as circuitry, that analyzes the recommended tuning value and the sample identification information output by the first analysis unit,
wherein:
the first analysis unit outputs the recommended tuning value and sample identification information for each analysis rule included in the predetermined set of analysis rules, and
the second analysis unit outputs a recommended rule set obtained by reducing the number of analysis rules included in the predetermined set of analysis rules on the basis of the sample identification information.

5. The analysis rule adjustment device according to claim 3, further comprising:
a memory that stores the analysis result of the log analysis unit,
wherein the first analysis unit performs an analysis on a different set of analysis rules on the basis of the analysis result stored in the memory.

6. The analysis rule adjustment device according to claim 1, wherein the log analysis unit receives designation of a predetermined range of parameters as the tuning condition and analyzes each of the communication logs with respect to the predetermined range being designated.

7. The analysis rule adjustment device according to claim 1, further comprising:

a feedback unit, implemented as circuitry, that updates the predetermined set of analysis rules on the basis of the recommended tuning value calculated by the first analysis unit.

8. An analysis rule adjustment system that adjusts an analysis rule used in analyzing a communication log to detect malicious communication through a network, the system comprising:
log storage circuitry that acquires, normalizes and stores a communication log through a network to be defended and a communication log generated by malware; and
analysis rule adjustment circuitry that adjusts the analysis rule by analyzing each of the communication logs stored in the log storage circuitry,
wherein:
the analysis rule adjustment circuitry includes:
log acquisition circuitry that acquires each of the communication logs from the log storage circuitry;
log analysis circuitry that analyzes each of the communication logs acquired by the log acquisition circuitry on the basis of each analysis rule included in a predetermined set of analysis rules and a tuning condition, the predetermined set of analysis rules and the tuning condition being used to analyze the same communication log; and
first analysis circuitry that analyzes an analysis result on the basis of each analysis rule included in the predetermined set of analysis rules of the log analysis circuitry and calculates a recommended tuning value corresponding to each analysis rule included in the predetermined set of analysis rules and used in an adjustment of the predetermined set of analysis rules and satisfying the tuning condition, the predetermined set of analysis rules that has been adjusted by the recommended tuning value preventing intrusion of malicious communication into the network.

9. An analysis rule adjustment method that adjusts an analysis rule used in analyzing a communication log to detect malicious communication through a network, the method comprising:
acquiring, using circuitry, a communication log through a network to be defended and a communication log generated by malware and storing each of the communication logs in log storage circuitry;
acquiring, using circuitry, each of the communication logs stored in the log storage circuitry;
analyzing, using circuitry, each of the acquired communication logs on the basis of each analysis rule included in a predetermined set of analysis rules and a tuning condition, the predetermined set of analysis rules and the tuning condition being used to analyze the same communication log; and
analyzing, using circuitry, an analysis result of analyzing each of the acquired communication logs, on the basis of each analysis rule included in the predetermined set of analysis rules and calculating a recommended tuning value corresponding to each analysis rule included in the predetermined set of analysis rules and used in an adjustment of the predetermined set of analysis rules and satisfies the tuning condition, the predetermined set of analysis rules that has been adjusted by the recommended tuning value preventing intrusion of malicious communication into the network.

10. A non-transitory computer readable recording medium having stored therein a program which causes a computer to adjust an analysis rule used in analyzing a communication log to detect malicious communication through a network and prevent intrusion, the program comprising:

acquiring a communication log through a network to be defended and a communication log generated by malware;

analyzing each of the acquired communication logs on the basis of each analysis rule included in a predetermined set of analysis rules and a tuning condition, the predetermined set of analysis rules and the tuning condition being used to analyze the same communication log; and analyzing an analysis result of analyzing each of the acquired communication logs, on the basis of each analysis rule included in the predetermined set of analysis rules and calculating a recommended tuning value corresponding to each analysis rule included in the predetermined set of analysis rules and used in an adjustment of the predetermined set of analysis rules and satisfies the tuning condition, the predetermined set of analysis rules that has been adjusted by the recommended tuning value preventing intrusion of malicious communication into the network.

11. The analysis rule adjustment device according to claim 1, further comprising:
intrusion prevention circuitry to prevent malicious communication into the network using the predetermined analysis rule that has been adjusted by the recommended tuning value.

12. The analysis rule adjustment device according to claim 4, further comprising:
intrusion prevention circuitry prevents the malicious communication into the network using the predetermined analysis rule that has been adjusted by the recommended tuning value and the recommended rule set.

13. The system according to claim 8, further comprising:
intrusion prevention circuitry to prevent malicious communication into the network using the analysis rule that has been adjusted.

14. The method according to claim 9, further comprising:
preventing malicious communication into the network using the predetermined analysis rule that has been adjusted by the recommended tuning value.

15. The non-transitory computer readable recording medium, according to claim 10, wherein the program further comprises:
preventing malicious communication into the network using the predetermined analysis rule that has been adjusted by the recommended tuning value.

* * * * *